United States Patent

Yano et al.

[11] Patent Number: 5,985,404
[45] Date of Patent: Nov. 16, 1999

[54] RECORDING MEDIUM, METHOD OF MAKING, AND INFORMATION PROCESSING APPARATUS

[75] Inventors: Yoshihiko Yano; Katsuto Nagano, both of Kanagawa, Japan

[73] Assignee: TDK Corporation, Tokyo, Japan

[21] Appl. No.: 08/834,298

[22] Filed: Apr. 15, 1997

[30] Foreign Application Priority Data

Aug. 28, 1996 [JP] Japan .................................. 8-245642

[51] Int. Cl.⁶ ........................................................ G11B 5/66
[52] U.S. Cl. ................ 428/65.3; 428/65.4; 428/65.5; 428/141; 428/336; 428/463; 428/694 TS; 428/694 TP; 428/694 XS; 428/694 SG; 428/694 ST; 428/900
[58] Field of Search ................... 428/65.3, 65.4, 428/65.5, 141, 362, 336, 468, 694 TP, 694 TS, 694 XS, 694 SG, 694 ST, 900

[56] References Cited

U.S. PATENT DOCUMENTS

| 5,216,631 | 6/1993 | Sliwa, Jr. | 365/174 |
|---|---|---|---|
| 5,307,311 | 4/1994 | Sliwa, Jr. | 365/174 |
| 5,738,927 | 4/1998 | Nakamura | 428/141 |

FOREIGN PATENT DOCUMENTS

| 63-161552 | 7/1988 | Japan . |
|---|---|---|
| 63-193349 | 8/1988 | Japan . |
| 5-282717 | 10/1993 | Japan . |
| 8-115600 | 5/1996 | Japan . |

OTHER PUBLICATIONS

T. Hidaka, Appl. Phys. Lett., vol. 68, No. 17, pp. 2358 & 2359, Apr. 22, 1996, "Formation and Observation of 50 NM Polarized Domains in $PBZr_{1-x}Ti_xO_3$ Thin Film Using Scanning Probe Microscope".

J. Appl. Phys. vol. 57, No. 5, pp. 1437–1444, Mar. 1, 1985, J. R. Matey, et al., "Scanning Capacitance Microscopy".

J. Appl. Phys. vol. 70, No. 5, pp. 2725–2733, Sep. 1, 1991, R. C. Barrett, et al., "Charge Storage in a Nitride–Oxide–Silicon Medium by Scanning Capacitance Microscopy".

*Primary Examiner*—Leszek Kiliman
*Attorney, Agent, or Firm*—Oblon, Spivak, McClelland, Maier & Neustadt, P.C.

[57] ABSTRACT

In conjunction with a recording medium for recording and reading information by utilizing the construction of AFM or STM and the polarization reversal of a ferroelectric material as well as an information processing apparatus having the recording medium, an object of the invention is to tailor the medium noiseless and sufficiently reliable to withstand repetitive data rewriting. The recording medium has a ferroelectric layer having unidirectionally oriented crystal axes on a substrate, and the ferroelectric layer has a ten point mean roughness Rz of up to 2 nm across a reference length of 500 nm over at least 80% of its surface. A protective layer or a lubricating layer may be disposed on the surface of the ferroelectric layer.

29 Claims, 13 Drawing Sheets

RECORDING MEDIUM, METHOD OF MAKING, AND INFORMATION PROCESSING APPARATUS

BACKGROUND OF THE INVENTION

1. Technical Field

This invention relates to a recording medium suitable for use in high density, high capacity recording systems such as computers, a method for preparing the same, and an information processing apparatus using the same.

2. Background Art

Nowadays it is generally recognized that the multi-media society has come. There have been developed practical methods for carrying out information processing by combining a personal computer as the center unit with a network system, communications system, video system, audio system or the like. Of these systems, information recording media, that is, memories play a great role and there is an infinite demand for the improvement in the capability thereof. Typical demands are high density recording, great recording capacity, quick response, low error rate, low power consumption, and low price.

Commonly used memories include semiconductor memories such as DRAM, SRAM, and EEPROM and rotating memories such as magnetic discs, magnetooptical discs, and optical discs. In particular, inexpensive, high-density recording media using organic thin film were recently marketed by virtue of the advanced laser technology.

On the other hand, a scanning tunneling microscope (STM) was developed in 1982 which can observe atoms one by one. An atomic force microscope (AFM) appeared as one application of the principle of this apparatus. With these microscopes, there can be obtained the information at the atomic level about irregularities of various materials. The STM and AFM not only serve as observation means, but are expected to find a wider range of application. For example, Japanese Patent Application Kokai (JP-A) No. 161552/1988 discloses the application of STM as a memory.

Also a scanning capacitance microscope (SCaM) analogous to STM and AFM is reported in J. Appl. Phys., 57, 1437 (1985). The SCAM is a scanning microscope using a probe and operates such that local capacitance changes on a surface of a test sample are detected by the probe and the data are converted into an image. This report also describes the application of SCaM to a memory involving rotating a disc-shaped medium and carrying out write/read operation on the medium by means of the SCaM probe.

The report of J. Appl. Phys., 70, 2725 (1991) describes how to apply AFM to memories. This method combines AFM with SCaM and carries out write/read operation using a conductive AFM probe. The recording medium used has a MNOS (metal-nitride-oxide-semiconductor) structure. Information is written by applying a pulse voltage across the medium by the AFM probe for causing the medium to capture an electric charge. As a result, a depletion layer is formed in the silicon semiconductor substrate to change the capacitance of the probed region, thereby achieving information storage. The stored information is read by scanning the recording medium with the probe while applying an appropriate high-frequency bias voltage between the medium and the probe. Since the capacitance between the probe and the medium is different between the charge-captured region and the charge-uncaptured region, the stored information can be read out by detecting capacitance changes associated with probe scanning. The stored information may be erased as by applying a pulse voltage of opposite polarity to that used upon recording.

An analogous method using a ferroelectric material in a recording medium is disclosed in JP-A 193349/1988. The ferroelectric material reverses its polarization at a certain threshold voltage. When a ferroelectric material is used, information is written by applying a pulse voltage across the ferroelectric material by means of an AFM probe or the like to thereby align the polarization unidirectionally or reverse the polarization only in the probed region. For information reading, the piezoelectric effect, pyroelectric effect, electro-optical effect and detection of current flow upon polarization reversal may be utilized. When the piezoelectric effect is utilized, the following procedure is taken, for example. While an appropriate high-frequency bias voltage is applied between the recording medium and the probe, the medium is scanned with the probe. At this point, the surface of the recording medium is deformed by the piezoelectric effect of the ferroelectric material. Since the piezoelectric effect of a ferroelectric material varies with its polarized state, a deformation corresponding to the written information appears on the surface of the recording medium. This deformation is detected by the probe, thereby achieving information read-out. The stored information may be erased as by applying a pulse voltage of opposite polarity to that used upon recording for thereby reversing the polarization.

If a ferroelectric thin film is formed on a substrate of semiconductor silicon, storage and retrieval can be carried out by the aforementioned method using AFM combined with SCaM. In this case, a depletion layer is formed by utilizing the charge capture/release phenomenon associated with the polarization reversal of the ferroelectric layer. Since this method utilizes the ferroelectric material, the writing voltage may be a low voltage of the order to cause the ferroelectric material to reverse its polarization. Since the polarization reversal of the ferroelectric material takes place at a high rate, the writing speed is high.

The AFM or STM has a resolving power of the atomic level. Also, the ferroelectric material has a rate of polarization reversal as high as 100 ns or less and record bits can be formed to a size of less than 10 nm in diameter. If record bits are formed in a region of 10 nm×10 nm, for example, a memory with a high density of about $10_6$ Mbits/cm$^2$ can be manufactured.

As the ferroelectric medium for AFM or STM memories as mentioned above, a medium comprising a substrate, a conductor layer formed thereon, and a polycrystalline ferroelectric thin film formed thereon has been used. In the medium having a polycrystalline ferroelectric thin film, grain boundaries and surface irregularities of the ferroelectric thin film become noise.

Since the distance between a probe and a medium in the AFM or STM memory is of the order of nanometers, the memory medium is also required to have a surface which is uniform on the order of nanometer. The uniformity of various parameters including surface irregularities, crystallinity and surface trapped electric charge is important. The reason is that since the servo system used applies voltage across an actuator connected to the probe so as to provide a constant tunnel current or atomic force upon writing and reading, bits cannot be normally read out or high-speed operation cannot be carried out if various parameters of the medium including surface irregularities, crystallinity and surface trapped electric charge are less uniform. Also, since the SCaM memory is adapted to detect a local capacitance by the probe, surface irregularities, crystallinity and surface trapped electric charge are directly introduced into record bit signals. In the prior art, media using a ferroelectric thin film are insufficient in surface uniformity and no media having a surface which is uniform on the order of nanometers have never been utilized. Further, the prior art media are susceptible to damage because the surface of the ferroelectric thin film is exposed outside. Moreover, the problem that the electric charge localized at some spots in the ferroelectric thin film becomes noise has also been revealed. It is believed that the charge localization is induced by the pyroelectric effect and crystal defects of ferroelectric material and causes not only noise, but failure of the probe tip.

Therefore, (1) a medium having high surface flatness, (2) a medium having uniform crystallinity, (3) a medium resistant to surface damage, and (4) a medium free of electric defects, especially charge localization are required in order that the memory medium be noiseless and sufficiently reliable to withstand repetitive data rewriting.

DISCLOSURE OF THE INVENTION

In conjunction with a recording medium for recording and retrieving information by utilizing the construction of AFM or STM and the polarization reversal of a ferroelectric material as well as an information processing apparatus having the recording medium, an object of the invention is to tailor the medium noiseless and sufficiently reliable to withstand repetitive data rewriting.

This and other objects are achieved by the present invention, which is defined below as (1) to (31).

(1) A recording medium for recording information by utilizing the polarization reversal of a ferroelectric material, comprising a ferroelectric layer having unidirectionally oriented crystal axes on a substrate, said ferroelectric layer having a ten point mean roughness Rz of up to 2 nm across a reference length of 500 nm over at least 80% of its surface.

(2) The recording medium of (1) wherein said substrate is a silicon single crystal having a Si (111) plane or Si (100) plane at its surface.

(3) The recording medium of (2) wherein said substrate is constructed of a silicon single crystal having a Si (100) plane at its surface, and said ferroelectric layer is a (001) unidirectionally oriented film constructed of a perbvskite type material, a (001) unidirectionally oriented film constructed of a tungsten bronze type material or a (0001) unidirectionally oriented film constructed of an oxide material containing a rare earth element (inclusive of scandium and yttrium), manganese and oxygen and having a hexagonal $YMnO_3$ crystalline structure.

(4) The recording medium of (2) wherein said substrate is constructed of a silicon single crystal having a Si (111) plane at its surface, and said ferroelectric layer is a (0001) unidirectionally oriented film constructed of an oxide material containing a rare earth element (inclusive of scandium and yttrium), manganese and oxygen and having a hexagonal $YMnO_3$ crystalline structure.

(5) The recording medium of (3) wherein said ferroelectric layer is an epitaxial film.

(6) The recording medium of (2) comprising a unidirectionally oriented intermediate oxide layer between said ferroelectric layer and said substrate, wherein said intermediate oxide layer includes a zirconium oxide base layer and/or a rare earth oxide base layer, said zirconium oxide base layer is constructed of zirconium oxide or zirconium oxide stabilized with a rare earth element (inclusive of scandium and yttrium), and said rare earth oxide base layer is constructed of a rare earth element (inclusive of scandium and yttrium) oxide.

(7) The recording medium of (6) wherein said substrate has a Si (100) plane at its surface, and said intermediate oxide layer includes a zirconium oxide base layer which is a tetragonal or monoclinic (001) unidirectionally oriented film or a cubic (100) unidirectionally oriented film, or said intermediate oxide layer includes a rare earth oxide base layer which is a (111) unidirectionally oriented film.

(8) The recording medium of (6) wherein said substrate has a Si (111) plane at its surface, and said intermediate oxide layer includes a zirconium oxide base layer of (111) unidirectional orientation, or said intermediate oxide layer includes a rare earth oxide base layer of (111) unidirectional orientation.

(9) The recording medium of (1) further comprising an electrode layer having unidirectionally oriented crystal axes between said substrate and said ferroelectric layer or between said substrate and said intermediate oxide layer.

(10) The recording medium of (9) wherein said ferroelectric layer is a (001) unidirectionally oriented film constructed of a perovskite type material or a (001) unidirectionally oriented film constructed of a tungsten bronze type material, and said electrode layer is a tetragonal (001) unidirectionally oriented film or a cubic (100) unidirectionally oriented film.

(11) The recording medium of (9) wherein said ferroelectric layer is a (0001) unidirectionally oriented film constructed of an oxide material containing a rare earth element (inclusive of scandium and yttrium), manganese and oxygen and having a hexagonal $YMnO_3$ crystalline structure, and said electrode layer is a (111) unidirectionally oriented film.

(12) The recording medium of (9) wherein said electrode layer is constructed of a metal or conductive oxide.

(13) The recording medium of (12) wherein said metal contains at least one member selected from the group consisting of Pt, Ir, Os, Re, Pd, Rh, and Ru, and said conductive oxide is an indium-containing oxide or perovskite oxide.

(14) The recording medium of (1) wherein said substrate is conductive.

(15) The recording medium of (1) wherein said substrate is a semiconductor so that a depletion layer is formed in the substrate as a result of polarization reversal of the ferroelectric layer.

(16) A recording medium for recording information by utilizing the polarization reversal of a ferroelectric material, comprising a ferroelectric layer on a substrate, said ferroelectric layer having been treated on its surface to be conductive.

(17) A recording medium for recording information by utilizing the polarization reversal of a ferroelectric material, comprising a ferroelectric layer on a substrate and a protective layer on said ferroelectric layer.

(18) The recording medium of (17) wherein said protective layer has a resistivity of 10 to $10^7$ Ωcm.

(19) The recording medium of (17) wherein said protective layer is amorphous.

(20) The recording medium of (16) or (17) having the construction of (1).

(21) A recording medium for recording information by utilizing the polarization reversal of a ferroelectric material, comprising a ferroelectric layer on a substrate, wherein a lubricating layer constructed of a lubricating material is disposed on the surface of said ferroelectric layer or the surface of said ferroelectric layer has been treated to be lubricative.

(22) The recording medium of (21) wherein said lubricating material is a solid lubricant.

(23) The recording medium of (21) wherein said lubricating material is a liquid lubricant.

(24) The recording medium of (21) wherein said lubricating material is a gas lubricant.

(25) The recording medium of (21) having the construction of (1).

(26) The recording medium of (1) wherein said ferroelectric layer has a thickness of 5 to 70 nm.

(27) The recording medium of (1) wherein said ferroelectric layer has been annealed at 300 to 600° C.

(28) The recording medium of (1) wherein said ferroelectric layer has been mechanically and/or chemically polished on its surface.

(29) The recording medium of (28) wherein said ferroelectric layer has been polished and then annealed at 300 to 850° C.

(30) An information processing apparatus comprising the recording medium of (1).

(31) The information processing apparatus of (30) comprising a probe mounted on a flying slider for writing and reading information from the recording medium.

FUNCTION

The recording medium of the invention includes a ferroelectric layer whose crystallographic axes are unidirectionally oriented and whose surface irregularities are regarded flat on the molecular level. Since the ferroelectric layer having a high degree of flatness as required for recording media utilizing the construction of an atomic force microscope (AFM) or scanning tunneling microscope (STM) and uniform crystallinity is included, the recording medium ensures noise reduction and high-speed operation when record bits are formed. Further, where a silicon single crystal substrate is used, a highly crystalline ferroelectric layer can be produced thereon at a low cost.

The present invention is predicated on the finding that especially for an epitaxial film, it is possible to eliminate the grain boundary and minimize surface irregularities. Such a film is little affected by noise.

It is noted that a ferroelectric layer might not be unidirectionally oriented when it has a particular composition or is formed under particular conditions. Unidirectional orientation can be accomplished by controlling the annealing conditions or thickness of the ferroelectric layer. In one example where a ferroelectric layer of about 300 nm thick is formed using lead titanate having about 10 mol % of a rare earth element added thereto as the ferroelectric material, the layer exhibits (001) unidirectional orientation immediately after formation. When the layer is annealed at 750° C. for improving the ferroelectric properties thereof, there results a mixture of (001) oriented crystals and (100) oriented crystals. However, if the annealing temperature is decreased to 600° C. or lower, the ferroelectric layer can maintain (001) unidirectional orientation. Also, if the thickness of the ferroelectric layer is reduced to 5 to 70 nm, the (001) unidirectional orientation is established independent of the annealing temperature, which allows the layer to be annealed at high temperatures in excess of 600° C. so that the ferroelectric properties may be further improved.

According to the invention, the surface of the ferroelectric layer can be improved in the degree of flatness by polishing the surface. A ferroelectric layer might have an insufficient degree of flatness when it has a particular composition or is formed under particular conditions. Even in this case, polishing of the layer can improve its degree of flatness, thereby suppressing noise.

In the information processing apparatus utilizing the construction of AFM or STM, detection signals contain specific components (noise) caused by the swell, irregularities, strains, and compositional deviation of the medium surface, probe driving mode, etc. In this regard, the present invention is successful in increasing the S/N and reliability by increasing the crystallinity of a ferroelectric layer and minimizing the surface irregularities thereof.

Since the recording medium contemplated herein is adapted to carry out storage and retrieval by scanning it with a probe, the information processing apparatus is equipped with not only the probe body, but also a drive mechanism necessary for the scanning operation. Therefore, the medium can be damaged by physical contact between the probe and the medium, entry between the medium and the probe of fragments resulting from abrasion of the drive mechanism, physical contact between the probe and the medium caused by vibration of the drive mechanism, and the like. According to the invention, a protective layer can be formed on the surface of the ferroelectric layer to prevent such damages, establishing sufficiently high reliability to withstand repetitive data rewriting.

Further, if the protective layer is given appropriate conductivity, the electric charge on the ferroelectric layer surface is made uniform, preventing the concentration of electric charge from locally occurring on the ferroelectric layer surface by the pyroelectric effect and crystal defects of the ferroelectric and accordingly, preventing noise and probe failure by the concentrated electric charge.

Further, according to the invention, the surface of the ferroelectric layer is made lubricative, thereby providing a recording medium with sufficiently high reliability to withstand repetitive data rewriting. Such lubricity can also be imparted by constructing the information processing apparatus such that the probe is mounted on a flying slider.

ILLUSTRATIVE CONSTRUCTION

Now, embodiments of the present invention are described in detail.

Recording/retrieving apparatus

The recording medium of the invention is loaded in an information processing apparatus or recording/retrieving apparatus having a conductive probe. The recording (or writing) and retrieving (or reading) actions of this information processing apparatus are the same as the recording and retrieving actions found in the aforementioned STM, SCaM and AFM having a conductive probe.

Figure 1:
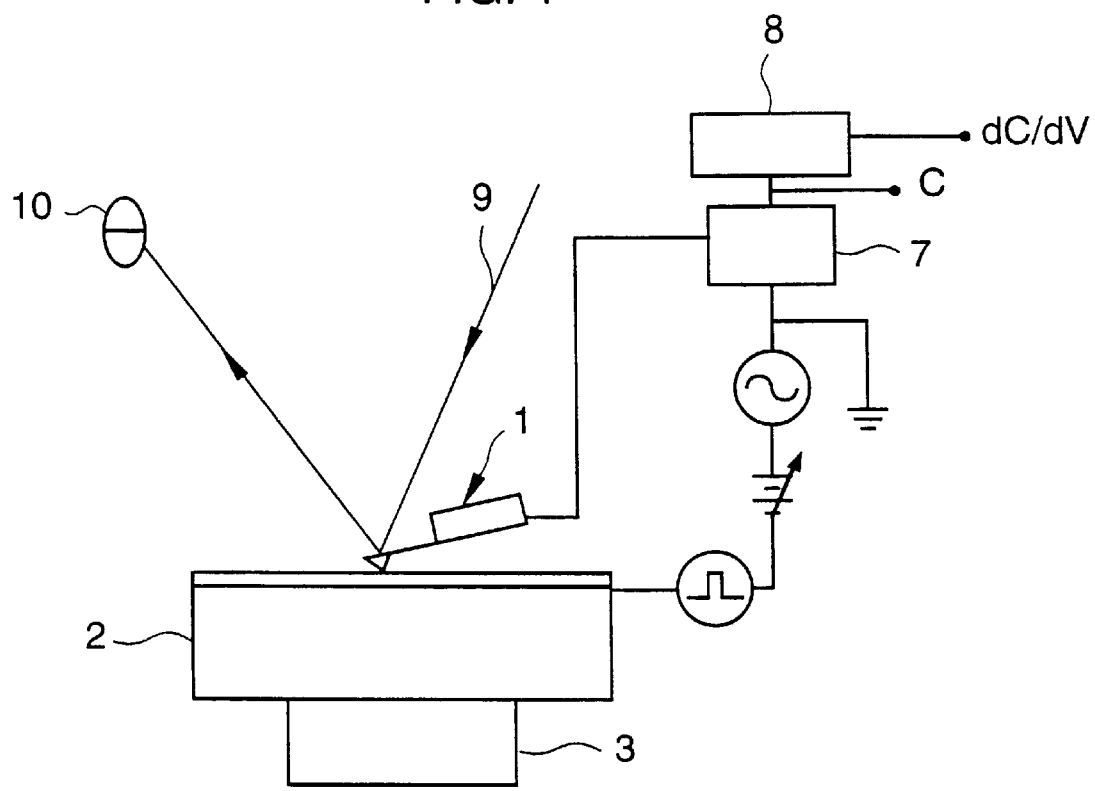
FIG. 1 is a schematic view illustrating one exemplary construction of the information processing apparatus according to the invention.

FIG. 1 illustrates one exemplary construction of an information processing apparatus which is loaded with the recording medium according to the invention.

The information processing apparatus shown in FIG. 1 is achieved by adding two major modifications to the construction of a conventional atomic force microscope (AFM). One modification is that the AFM probe is conductive and the other modification is that the AFM probe is equipped with a capacitive sensor.

The information processing apparatus includes a conductive AFM probe 1 for carrying out write and read operation on a recording medium 2. The information processing apparatus of FIG. 1 further includes a displacement detecting photo-detector 10 for detecting a displacement of the conductive AFM probe 1 using a laser beam 9. Since the recording medium 2 is rested on a XY scanning drive mechanism 3 using a piezoelectric actuator, the scanning of the recording medium 2 with the conductive AFM probe 1 is carried out by moving the medium 2.

For writing, the following three methods are mainly employed. The first method uses a recording medium which has been treated (initializing treatment) so that the ferroelectric layer is polarized in one direction. While the recording medium 2 is scanned with the conductive AFM probe 1, a pulse voltage having polarity in one direction corresponding to the information to be recorded is applied between the probe 1 and the medium 2 to reverse the polarization. The spot where polarization is reversed represents "0" or "1" while the spot where polarization is not reversed represents "1" or "0". The second method applies a pulse voltage having bidirectional polarity. In the spot where a pulse voltage of different polarity is applied, the direction of polarization is reversed. As a consequence, there are formed record bits as in the first method. Note that the recording medium used herein may have been or have not been initialized. The third method is to apply a pulse voltage with polarity in one direction across a recording medium comprising a ferroelectric layer which has not been initialized and has random polarization direction. The spot where the voltage is applied is polarized in one direction while the spot where no voltage is applied remains randomly polarized. Thus readout by a method to be described later is possible. In these methods, the strength of the pulse voltage may be set such that an electric field greater than the coercive electric field of the ferroelectric layer is applied across the recording medium.

The medium structure of FIG. 2 to be described later wherein semiconductor silicon is used as a substrate ensures record-retaining operation because a distinction whether or not a depletion layer is formed occurs depending on the direction of polarization of the ferroelectric layer.

The stored information is read out by scanning the recording medium 2 with the conductive AFM probe 1 while applying an appropriate high-frequency bias voltage between the probe 1 and the medium 2. Capacitive component signals (C and dC/dV) appearing in response to the high-frequency bias voltage between the conductive AFM probe 1 and the recording medium 2 are detected by a capacitive sensor 7 and a rock-in amplifier 8. The record bits are read out since the capacitive component changes with the direction of polarization. Record bits in the medium of the structure using a semiconductor substrate as shown in FIG. 2 are similarly read out because the capacitance is changed by the formation of a depletion layer.

It is noted that although the apparatus based on AFM is shown in FIG. 1, an apparatus based on STM is also employable in the present invention.

For readout, the piezoelectric effect, pyroelectric effect and electro-optical effect of a ferroelectric material can also be utilized. For example, the recording medium is scanned with the conductive AFM probe while an appropriate high-frequency bias voltage is applied between the medium and the probe. The medium is deformed due to the piezoelectric effect of the ferroelectric material. Since the piezoelectric effect varies with the direction of polarization, a corresponding change appears in the deformation signal detected by the conductive AFM probe. The stored information can be read out in this way.

Although the above-mentioned two readout methods are non-destructive readout in that the record bits are stored even after the readout, the destructive readout is acceptable that the record bits are erased by readout. In this case, a STM or an AFM having a conductive probe is used, for example, the recording medium is scanned with the probe while an appropriate high-frequency bias voltage is applied between the recording medium and the probe. The high-frequency bias voltage is set at a value enabling the ferroelectric material to reverse its polarization. Upon application of the high-frequency bias voltage, polarization reversing current flows between the medium and the conductive probe. Since this current flow varies with the direction of polarization of the ferroelectric material, there appears a change of current quantity corresponding to the stored information. Accordingly, the stored information can be read out by detecting a change of the current through the probe resulting from probe scanning. Where destructive readout is carried out, re-writing is necessary after the readout.

It is noted that when information is written by the first method, the stored information can be erased by applying a pulse voltage of opposite polarity to that used in recording to thereby reverse the polarization. When information is written by the second or third method, the stored information can be erased by initialization. The medium which has been written by any of the first to third methods can be overwritten by the second method.

In the information processing apparatus used in the present invention, the shape of the recording medium is not particularly limited and the method of achieving relative motion between the recording medium and the probe is also not particularly limited. In one example using a disc-shaped recording medium, it is possible to rotate the medium relative to the probe. It is also possible to drive the medium along two axes or more directions by means of an actuator, to drive the probe similarly, or to drive both the medium and the probe. It is further possible to arrange a plurality of conductive probes.

Structure of recording medium

Figure 2:
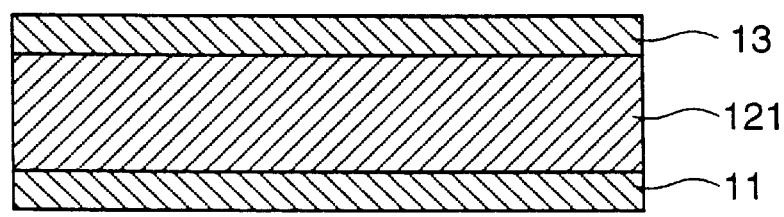
FIG. 2 is a cross-sectional view of one exemplary construction of the recording medium according to the invention.
Figure 3:
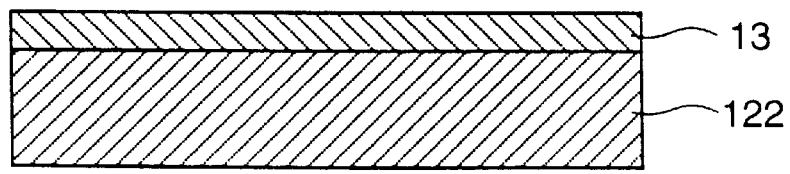
FIG. 3 is a cross-sectional view of another exemplary construction of the recording medium according to the invention.
Figure 4:
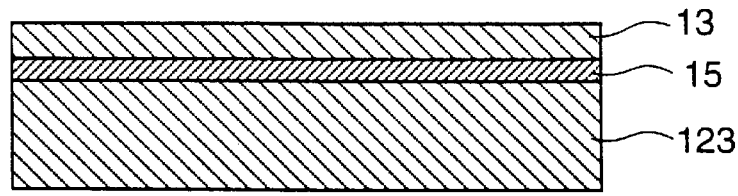
FIG. 4 is a cross-sectional view of a further exemplary construction of the recording medium according to the invention.

The recording medium of the invention can have the structures shown in FIGS. 2 to 4, for example.

The recording medium shown in FIG. 2 includes a semiconductor substrate 121 of silicon or the like and a ferroelectric layer 13 on one surface thereof. An ohmic electrode 11 is disposed on the back surface of the semiconductor substrate 121. The ohmic electrode 11 is opposed to the conductive probe through the ferroelectric layer 13 and the semiconductor substrate 121. Insofar as the ohmic electrode 11 functions as the opposed electrode, it may also be disposed at any position other than the substrate back surface.

Preferably the semiconductor substrate is of p- or n-conductivity type and has a resistivity of about $10^{-4}$ to $10^6$ $\Omega$cm, especially about $10^{-2}$ to $10^6$ $\Omega$cm. The use of a semiconductor substrate enables formation of a depletion layer as previously described in conjunction with the information processing apparatus. It is understood that the depletion layer is a space-charge layer formed in a potential barrier region at the surface or interface of a semiconductor. Since the depletion layer contains less free electrons in the semiconductor and has a higher resistivity, it becomes a layer having a capacitive component. Then the capacitance of a written region can be changed.

It is noted that in FIG. 2, a layer of $SiO_2$ or another oxide may be present between the semiconductor substrate and the ferroelectric layer as will be described later.

The recording medium shown in FIG. 3 includes a conductive substrate 122 of silicon or the like and a ferroelectric layer 13 on one surface thereof. The conductive substrate functions as an electrode opposed to the conductive probe. The conductive substrate is preferably constructed of a material having a resistivity of $10^{-7}$ to $10^{-2}$ $\Omega$cm in bulk form.

It is noted that in FIG. 3, a layer of $SiO_2$ or another oxide may be present between the conductive substrate and the ferroelectric layer as will be described later.

The recording medium shown in FIG. 4 includes a substrate 123, an electrode layer 15 on one surface thereof, and a ferroelectric layer 13 on the surface of the electrode layer 15. The electrode layer functions as an electrode opposed to the conductive probe. The electrode layer preferably has a resistivity of $10^{-7}$ to $10^{-2}$ $\Omega$cm. Since this recording medium includes the electrode layer, the conductive characteristics of the substrate are not critical and any of insulator, semiconductor and conductor substrates may be used.

It is noted that in FIG. 4, a layer of $SiO_2$ or another oxide may be present between the substrate and the electrode layer as will be described later.

In FIGS. 2 to 4, the substrate generally has a thickness of about 100 $\mu$m to about 1 mm.

In FIGS. 2 to 4, the ferroelectric layer 13 has a thickness of preferably more than 5 nm, more preferably more than 10 nm, most preferably more than 20 nm and preferably less than 1000 nm, more preferably less than 500 nm, and most preferably less than 70 nm. A too thin ferroelectric layer does not allow for polarization reversal. If the ferroelectric layer is too thick, a greater voltage is required to induce polarization reversal in the ferroelectric layer and hence, a greater write voltage (e.g., more than 20 volts) is required and the ferroelectric layer is exacerbated in the degree of surface flatness. As previously mentioned, a ferroelectric layer might not be unidirectionally oriented when it has a particular composition or is formed or annealed under particular conditions. Even in such a case, by controlling the thickness of the ferroelectric layer to 5 to 70 nm, especially 10 to 70 nm, a unidirectionally oriented film can be formed and the ferroelectric layer be improved in the degree of surface flatness.

As previously mentioned, signals representative of recorded bits can be detected by scanning the recording medium with the conductive probe. These signals contain a component having superposed thereon the noise caused by surface properties of the recording medium and other factors. More particularly, noise components caused by the swell, irregularities, strains, and compositional deviation of the ferroelectric layer surface and noise components inherent to the probe drive mode are superposed on essential signal components. Accordingly, in order to correctly recover the essential signal components, the S/N must be as high as possible. The most effective method for increasing S/N is by increasing the crystallinity of the ferroelectric layer to minimize the surface irregularities thereof. The recording medium according to the invention has a very high S/N ratio since the ferroelectric layer of the medium has a surface which is flat on the molecular level as demonstrated by its Rz value. In order to increase the crystallinity of the ferroelectric layer for minimizing the surface irregularities thereof, it is effective to form the ferroelectric layer as a unidirectionally oriented film, especially an epitaxial film as will be described later.

Substrate

The substrate material may be selected from various materials including glass, metals (inclusive of alloys), organic materials, single crystal and polycrystalline ceramics depending on the particular characteristics required for the substrate to be a semiconductor, conductor or insulator.

A single crystal substrate is preferably used in order to form a highly crystalline ferroelectric layer. The single crystal substrate is preferably constructed of such materials as magnesia, strontium titanate, sapphire, zirconia, stabilized zirconia, lithium niobate, lithium tantalate, gallium arsenide, and silicon. In particular, silicon single crystal substrates are preferred because of their low cost and good matching with semiconductor devices. The use of a single crystal substrate enables formation of a ferroelectric layer with ordered crystal orientation, typically a unidirectionally oriented film, especially an epitaxial film. The ferroelectric layer with ordered crystal orientation is adequate as a ferroelectric layer for a recording medium because it offers improved ferroelectric characteristics in that it has better surface characteristics than a polycrystalline ferroelectric layer, can have a greater residual polarization value, and can prevent misalignment of polarization under the influence of grain boundaries.

A unidirectionally oriented film, especially an epitaxial film is established when a thin film grows on the substrate in accordance with the array information of crystal lattice thereof. It is preferred in the practice of the invention to use a single crystal substrate presenting Si (100) plane or Si (111) plane as its surface.

Ferroelectric layer

Ferroelectric material

The material used in the ferroelectric layer is not critical and may be suitably selected from materials having ferroelectric characteristics. For example, the following materials are useful.

(A) Perovskite type materials: $BaTiO_3$; lead family perovskite materials such as $PbTiO_3$, rare earth element-containing lead titanate, PZT (lead zirconate titanate), and PLZT (lead lanthanum zirconate titanate); and bismuth family perovskite materials. Included are various simple, composite and layer perovskite compounds as mentioned above.

(B) Tungsten bronze type materials: Tungsten bronze type oxides such as SBN (strontium barium niobate) and PBN (lead barium niobate).

(C) $YMnO_3$ family materials: Oxides containing a rare earth element inclusive of scandium and yttrium, manganese and oxygen and having a hexagonal $YMnO_3$ structure, such as $YMnO_3$ and $HoMnO_3$.

These ferroelectric materials are described below.

(A) Of the perovskite type materials, $BaTiO_3$ and lead family perovskite compounds are generally represented by the chemical formula: $ABO_3$ wherein A and B stand for cations. A is preferably at least one member selected from the group consisting of Ca, Ba, Sr, Pb, K, Na, Li, La, and Cd, and B is preferably at least one member selected from the group consisting of Ti, Zr, Ta, and Nb.

In such perovskite type compounds, the ratio A/B preferably ranges from 0.8/1 to 1.3/1, more preferably from 0.9/1 to 1.2/1.

An A/B ratio in this range ensures that dielectric materials be insulating and be improved in crystallinity, leading to improvements in dielectric or ferroelectric characteristics. In contrast, no crystallinity improvement is expected at an A/B ratio of less than 0.8 whereas an A/B ratio of more than 1.3 tends to make it difficult to form a homogeneous thin film.

Such a A/B ratio is accomplished by controlling film deposition conditions. The stoichiometry of O in $ABO_3$ is not limited to 3. Some perovskite materials form a stable perovskite structure when they are in short or excess of oxygen. In $ABO_x$, x generally ranges from about 2.7 to about 3.3. It is understood that the A/B ratio can be determined by X-ray fluorescence analysis.

The perovskite compound of $ABO_3$ type used herein may be any of $A^{1+}B^{5+}O_3$, $A^{2+}B^{4+}O_3$, $A^{3+}B^{3+}O_3$, $A_xBO_3$, $A(B'_{0.67}B''_{0.33})O_3$, $A(B'_{0.33}B''_{0.67})O_3$, $A(B_{0.5}{}^{+3}B_{0.5}{}^{+5})O_3$, $A(B_{0.5}{}^{2+}B_{0.5}{}^{6+})O_3$, $A(B_{0.5}{}^{1+}B_{0.5}{}^{7+})O_3$, $A^{3+}(B_{0.5}{}^{2+}B_{0.5}{}^{4+})O_3$, $A(B_{0.25}{}^{1+}B_{0.75}{}^{5+})O_3$, $A(B_{0.5}{}^{3+}B_{0.5}{}^{4+})O_{2.75}$, $A(B_{0.5}{}^{2+}B_{0.5}{}^{5+})O_{2.75}$, etc.

More illustratively, included are lead family perovskite compounds such as PZT and PLZT, $CaTiO_3$, $BaTiO_3$, $PbTiO_3$, $KTaO_3$, $BiFeO_3$, $NaTaO_3$, $SrTiO_3$, $CdTiO_3$, $KNbO_3$, $LiNbO_3$, $LiTaO_3$, and solid solutions thereof.

It is understood that the PZT is a solid solution of $PbZrO_3$-$PbTiO_3$. The PLZT is a compound wherein PZT is doped with lanthanum and is represented by

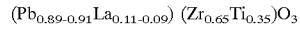

$(Pb_{0.89-0.91}La_{0.11-0.09})(Zr_{0.65}Ti_{0.35})O_3$ when expressed in the form of $ABO_3$.

Of the layer perovskite compounds, the bismuth family layer compounds are generally represented by the formula:

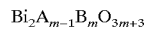

$Bi_2A_{m-1}B_mO_{3m+3}$ wherein m is an integer of 1 to 5, A is selected from the group consisting of Bi, Ca, Sr, Ba, Pb, Na, K and rare earth elements inclusive of Sc and Y, and B is selected from the group consisting of Ti, Ta and Nb. More illustratively, $Bi_4Ti_3O_{12}$, $SrBi_2Ta_2O_9$, and $SrBi_2Nb_2O_9$ are included. In the practice of the invention, any of these compounds may be used as well as solid solutions thereof.

The preferred perovskite compounds used herein are titanates or titanate-containing perovskite compounds, for example, $BaTiO_3$, $SrTiO_3$, PLZT, PZT, $CaTiO_3$, $PbTiO_3$, and rare earth element-containing lead titanates. More preferred are $BaTiO_3$, $SrTiO_3$, PZT, and rare earth element-containing lead titanates. Most preferred are rare earth element-containing lead titanates which contain R (which is at least one rare earth element selected from the group consisting of Pr, Nd, Eu, Tb, Dy, Ho, Yb, Y, Sm, Gd, Er, and La), Pb, Ti, and O in an atomic ratio in the range: $0.8 \leq (Pb+R)/Ti \leq 1.3$ and $0.5 \leq Pb/(Pb+R) \leq 0.99$.

(B) The tungsten bronze type materials are preferably those tungsten bronze type materials described in the collection of ferroelectric materials by Landoit-Borenstein, Vol. 16. Illustratively, $(Ba,Sr)Nb_2O_6$, $(Ba,Pb)Nb_2O_6$, $PbNb_2O_6$, $PbTa_2O_6$, $BaTa_2O_6$, $PbNb_4O_{11}$, $PbNb_2O_6$, $SrNb_2O_6$, and $BaNb_2O_6$ and solid solutions thereof are preferred. Especially preferred are SBN which is $(Ba,Sr)Nb_2O_6$ and PBN which is $(Ba,Pb)Nb_2O_6$.

(C) The $YMnO_3$ family materials are represented by the chemical formula $RMnO_3$ wherein R is preferably at least one member selected from the rare earth elements inclusive of scandium and yttrium. The $YMnO_3$ family materials preferably have a R/Mn ratio of 0.8/1 to 1.2/1, more preferably 0.9/1 to 1.1/1. A R/Mn ratio within this range ensures insulation and improves crystallinity and hence, ferroelectric characteristics. With R/Mn ratios of less than 0.8 or more than 1.2, materials tend to reduce their crystallinity. Especially with R/Mn ratios in excess of 1.2, materials tend to lose ferroelectric characteristics and become normal dielectric and are inapplicable to the devices utilizing polarization. Such a R/Mn ratio is accomplished by controlling film deposition conditions. It is noted that the R/Mn ratio can be determined by X-ray fluorescence analysis. The YMnO$_3$ family materials have a dielectric constant of about 10 to about 50 in bulk form and about 10 to about 100 in thin film form.

The preferred YMnO$_3$ family materials which are used herein have a hexagonal crystal structure. The YMnO$_3$ family materials include those having a hexagonal crystal structure and those having a rhombic crystal structure. Hexagonal crystal materials should be used to provide ferroelectric characteristics. Illustratively, those materials having a composition which is substantially YMnO$_3$, HoMnO$_3$, ErMnO$_3$, YbMnO$_3$, TmMnO$_3$, and LuMnO$_3$ and solid solutions thereof are used.

Crystal orientation

The ferroelectric layer is a film whose crystal axes are unidirectionally oriented, desirably a crystallized film having a polarization axis oriented perpendicular to the substrate surface. Where perovskite type materials are used, (001) unidirectionally oriented films, especially epitaxial films of the same orientation are preferred because better ferroelectric characteristics are obtained. Where tungsten bronze type materials are used, (001) unidirectionally oriented films, especially epitaxial films of the same orientation are preferred. Where hexagonal YMnO$_3$ family materials are used, (0001) unidirectionally oriented films, especially epitaxial films of the same orientation are preferred.

A ferroelectric layer constructed of a perovskite type material is preferably formed on the surface of a silicon (100) substrate. The preferred relationship of crystal axis orientation between the ferroelectric layer and the silicon substrate is described below. It is understood that silicon has a cubic system. Where the ferroelectric layer is (001) unidirectionally oriented, the preferred crystal axis orientation relationship is ferroelectric material [100] // Si [010], that is, in-plane axes of the ferroelectric layer are parallel to those of the silicon substrate.

A ferroelectric layer constructed of a tungsten bronze type material is also preferably formed on the surface of a silicon (100) substrate. The preferred crystal axis orientation relationship between the ferroelectric layer and the silicon substrate is ferroelectric material [100] // Si [010].

A ferroelectric layer of (0001) orientation constructed of a hexagonal YMnO$_3$ family material is preferably formed on the surface of a silicon (111) substrate. It is noted that a hexagonal YMnO$_3$ family ferroelectric layer of (0001) orientation can be formed on a silicon (100) substrate if an intermediate oxide layer of (111) orientation or an electrode layer of (111) orientation is disposed as will be described later.

It is noted that the term "unidirectionally oriented film" used herein designates a crystallized film in which the objective crystal faces are aligned parallel to the substrate surface. Illustratively stated, a (001) unidirectionally oriented or c plane unidirectionally oriented film, for example, is a film which has an intensity of reflection other than on (00l) plane which is less than 10%, preferably less than 5% of the maximum peak intensity of reflection on (00l) plane as analyzed by 2θ-θ X-ray diffraction (XRD). Understandably, the (00l) plane generally designates those equivalent planes such as (001) and (002) planes. The same applies to (l00) and (lll) planes.

It is further noted that the term "epitaxial film" used herein means that crystals are oriented in alignment in all the directions of X, Y, and Z axes, provided that the film surface is a X-Y plane and the film's thickness direction is Z axis. More particularly, in the first place, on measurement by X-ray diffraction, the peak intensity of reflection on planes other than the objective plane must be less than 10%, preferably less than 5% of the maximum peak intensity on the objective plane. For example, a (001) epitaxial film or c plane epitaxial film, as analyzed by 2θ-θ X-ray diffraction, should have a peak intensity of reflection other than (00l) plane which is less than 10%, preferably less than 5% of the maximum peak intensity on (00l) plane. In the second place, a film as analyzed by RHEED should exhibit a spotty or streaky pattern. If these requirements are met, then this film is regarded to be an epitaxial film. It is understood that RHEED is an abbreviation of reflection high energy electron diffraction and the RHEED analysis is an index of the orientation of a crystal axis within a film plane.

Intermediate oxide layer

Where the ferroelectric layer is constructed of a perovskite type material, tungsten bronze type material or YMnO$_3$ family material, an intermediate oxide layer, which is now described in detail, is preferably disposed between the ferroelectric layer and the substrate. It is noted that the intermediate oxide layer also functions as an insulator.

Where the ferroelectric layer is constructed of a perovskite type material or tungsten bronze type material, the intermediate oxide layer should preferably be a zirconium oxide base layer to be described below or further include a rare earth oxide base layer to be described below or a perovskite subbing layer to be described below or include both a rare earth oxide base layer and a perovskite subbing layer. The order of stacking is zirconium oxide base layer → ferroelectric layer, or zirconium oxide base layer → rare earth oxide base layer → ferroelectric layer, or zirconium oxide base layer → perovskite subbing layer → ferroelectric layer, or zirconium oxide base layer → rare earth oxide base layer → perovskite subbing layer → ferroelectric layer.

Where the ferroelectric layer is constructed of a YMnO$_3$ family material, the intermediate oxide layer should preferably be a zirconium oxide base layer or rare earth oxide base layer.

Zirconium oxide base layer

The zirconium oxide base layer is composed mainly of zirconium oxide or zirconium oxide stabilized with a rare earth metal element (inclusive of scandium and yttrium), that is, stabilized zirconia. The provision of this layer prevents the overlying electrode layer or ferroelectric layer from being stripped. This layer also presents good lattice matching with ferroelectric material, allowing a highly crystalline ferroelectric layer to be formed thereon.

The zirconium oxide or stabilized zirconium oxide is preferably of the composition: $Zr_{1-x}R_xO_{2-\delta}$ wherein R is a rare earth metal element inclusive of scandium and yttrium, x and δ will be described later. R is preferably at least one member selected from the group consisting of Y, Pr, Ce, Nd, Gd, Tb, Dy, Ho and Er.

Desirably, the zirconium oxide base layer has unidirectional crystal orientation. The reason is that neither electrode layer nor ferroelectric layer can be epitaxially grown on a layer having a plurality of crystal faces because grain boundaries are present in such a layer. More particularly, when it is desired to form an electrode layer or ferroelectric layer of (001) orientation, the zirconium oxide base layer should preferably be tetragonal or monoclinic and of (001) unidirectional orientation or cubic and of (100) unidirectional orientation. When it is desired to form an electrode layer of (111) orientation or a ferroelectric layer of (0001) orientation, the zirconium oxide base layer should preferably be of (111) unidirectional orientation In either case, the zirconium oxide base layer should more preferably be an epitaxial film. If a zirconium oxide base layer with such improved crystallinity can be formed, the disturbance of physical quantities by grain boundaries is eliminated and an electrode layer or ferroelectric layer of quality is obtained on the zirconium oxide base layer.

Where an intermediate oxide layer $(Zr_{1-x}R_xO_{2-\delta})$ is deposited on a silicon (100) substrate surface, the preferred crystal orientation relationship between them is $Zr_{1-x}R_xO_{2-\delta}$ (001) // Si (100).

Where an intermediate oxide layer $(Zr_{1-x}R_xO_{2-\delta})$ is deposited on a silicon (111) substrate surface, the preferred crystal orientation relationship between them is $Zr_{1-x}R_xO_{2-\delta}$ (111) // Si (111).

$ZrO_2$ undergoes phase transition of cubic → tetragonal → monoclinic system as the temperature varies from high temperature to room temperature. Zirconium oxide having a rare earth element added thereto for stabilizing its cubic crystals is stabilized zirconia. The crystallinity of $Zr_{1-x}R_xO_{2-\delta}$ film depends on the range of x. As reported in Jpn. J. Appl. Phys., 27 (8), L1404–L1405 (1988), crystals are tetragonal or monoclinic in the compositional region where x is less than 0.2. Heretofore, epitaxial films of unidirectional orientation have been available in the cubic crystal region where x is 0.2 or more. It is noted that in the region where x is in excess of 0.75, crystals are cubic, but (100) unidirectional orientation is not available and crystals of (111) orientation are co-present. On the other hand, in the tetragonal or monoclinic region, no epitaxial films of unidirectional orientation have been available due to the introduction of undesirably oriented planes as described in J. Appl. Phys., 58 (6), 2407–2409 (1985).

Therefore, in order that $Zr_{1-x}R_xO_{2-\delta}$ assume cubic (100) unidirectional orientation, x should preferably range from 0.2 to 0.75. The more preferred range of x is from 0.2 to 0.50. If the zirconium oxide base layer is an epitaxial film, then it is easy for an electrode layer or ferroelectric layer to epitaxially grow thereon. On the other hand, if (111) unidirectional orientation is established on a (111) substrate, x may be in excess of 0.75. It is noted that $Zr_{1-x}R_xO_{2-\delta}$ wherein x is equal to 1 is a rare earth oxide layer to be described later.

The type and amount of the rare earth metal element contained in the stabilized zirconia are selected such that the zirconium oxide base layer may have a lattice constant which well matches with the lattice constants of the silicon substrate and a layer to be deposited on the zirconium oxide base layer. Although the lattice constant can be changed by changing parameter x for the fixed type of rare earth element, changing parameter x only affords a narrow adjustable range for lattice constant matching. In this regard, if Pr is used instead of Y, for example, a greater lattice constant is obtainable, providing for optimum matching.

It is understood that zirconium oxide free of oxygen defects is represented by the chemical formula: $ZrO_2$ while the amount of oxygen in the zirconium oxide having a rare earth element added thereto varies with the type, amount and valence of the rare earth element added, so that $\delta$ in $Zr_{1-x}R_xO_{2-\delta}$ generally ranges from 0 to 0.5.

In the region of $Zr_{1-x}R_xO_{2-\delta}$ wherein x is less than 0.2, especially the high purity region of the composition wherein the proportion of zirconium in the constituent elements other than oxygen is in excess of 93 mol %, neither satisfactory crystallinity nor satisfactory surface flatness has been obtained as previously mentioned. As a result of our successive study, we have found that the above-mentioned unidirectional orientation and even epitaxial growth becomes possible and surface flatness is improved to a satisfactory value by applying the preparation method to be described later. A $ZrO_2$ film of high purity, which has a higher insulation resistance enough to minimize leakage current, is preferred when insulating properties are needed.

Accordingly, where satisfactory crystallinity and surface flatness are obtained, the proportion of zirconium in the constituent elements excluding oxygen is preferably in excess of 93 mol %, more preferably at least 95 mol %, further preferably at least 98 mol %, most preferably at least 99.5 mol %. The constituent elements excluding oxygen and zirconium are generally rare earth elements and phosphorus. The upper limit of the proportion of zirconium is about 99.99 mol % at the present. Since separation of $ZrO_2$ from $HfO_2$ is difficult with the currently available ultra-purifying technique, the purity of $ZrO_2$ generally indicates the purity of Zr+Hf. Therefore, the purity of $ZrO_2$ in the specification is a value calculated on the assumption that Hf and Zr are identical. However, this gives rise to no problem because $HfO_2$ serves exactly the same function as $ZrO_2$ in the zirconium oxide base layer according to the invention.

It is noted that when an intermediate oxide layer is formed, oxygen in the intermediate oxide layer can diffuse in proximity to the surface of the substrate of silicon or the like to oxidize the substrate surface to a slight depth (for example, less than about 5 nm) to form an oxide layer of $SiO_2$ etc. Some film formation methods allow a silicon oxide layer to be left on the surface of the substrate of silicon or the like during formation of the intermediate oxide layer.

Rare earth oxide base layer

The rare earth oxide base layer is preferably constructed essentially of a rare earth oxide containing at least one member selected from the group consisting of Sc, Y, La, Ce, Pr, Nd, Sm, Eu, Gd, Tb, Dy, Ho, Er, Tm, Yb, and Lu, especially the group consisting of Ce, Pr, Nd, Gd, Tb, Dy, Ho and Er. Where two or more rare earth elements are used, their ratio is arbitrary.

The rare earth oxide base layer exhibits (111) orientation independent of the plane orientation of the substrate. That is, it assumes cubic (111) orientation regardless of whether a silicon (100) substrate or a silicon (111) substrate is used. This is convenient when a ferroelectric layer is constructed of a $YMnO_3$ family material.

It is noted that in the case of a layer structure including a zirconium oxide base layer of (001) orientation and a rare earth oxide base layer formed thereon, the rare earth oxide base layer assumes (001) orientation, which is convenient when a ferroelectric layer is constructed of a perovskite type material or tungsten bronze type material. When the aforementioned stabilized zirconia is used as the intermediate oxide layer, its C-V characteristics exhibit hysteresis and in this regard, it is inferior to the high purity $ZrO_2$ film. In this case, it is possible to deprive the C-V characteristics of hysteresis by depositing a rare earth oxide base layer on the zirconium oxide base layer. Also depositing a rare earth oxide base layer thereon further improves the lattice matching with the ferroelectric layer. Where the rare earth oxide base layer is stacked, the zirconium oxide base layer may be either a film having a uniform distribution of elements or a film of the graded structure that the composition varies in a film thickness direction. In the case of the graded structure film, the content of rare earth element in the zirconium oxide base layer increases gradually or stepwise and the content of zirconium decreases gradually or stepwise from the substrate side to the rare earth oxide base layer side. Such a graded structure film minimizes or eliminates the misfit of lattice between the zirconium oxide base layer and the rare earth oxide base layer, allowing the rare earth oxide base layer to be formed as a high crystallinity epitaxial film. In the case of such a layer structure, the rare earth element added to the rare earth oxide base layer is preferably the same as the rare earth element added to the zirconium oxide base layer.

Additives may be introduced into the zirconium oxide base layer and rare earth oxide base layer for the purpose of improving their characteristics. For example, if these layers are doped with an alkaline earth element such as Ca and Mg, then the number of pinholes in the film can be reduced to restrain leakage. Also, aluminum and silicon are effective for improving the resistivity of the film. Further, transition metal elements such as Mn, Fe, Co, and Ni allow the film to form therein an energy level (or trap level) due to the impurity, which can be utilized to control conductivity.

Perovskite subbing layer

The perovskite subbing layer is constructed of a perovskite type compound of the $ABO_3$ structure described in conjunction with the ferroelectric layer. The perovskite subbing layer is optionally provided for the purpose of increasing the crystallinity of the ferroelectric layer of perovskite type compounds or tungsten bronze type compounds. The perovskite subbing layer is preferably constructed of such materials as $BaTiO_3$, $SrTiO_3$ or solid solutions thereof, more preferably $BaTiO_3$. The perovskite subbing layer has improved lattice matching with the zirconium oxide base layer and rare earth oxide base layer and is constructed of a compound different from the material of the ferroelectric layer.

For example, when a ferroelectric layer of the aforementioned rare earth-containing lead titanate is formed close to the zirconium oxide base layer or rare earth oxide base layer, it is difficult to obtain the ferroelectric layer having the desired crystal orientation as previously mentioned. However, if such a ferroelectric layer of rare earth-containing lead titanate is formed on a perovskite subbing layer of $BaTiO_3$ or the like, the desired crystal orientation can be accomplished.

Also when an electrode layer as found in the recording medium of the structure shown in FIG. 4 is formed close to the zirconium oxide base layer or rare earth oxide base layer, it is difficult to obtain the electrode layer of tetragonal (001) orientation or cubic (100) orientation as will be described layer. However, if such an electrode layer is formed on a perovskite subbing layer of $BaTiO_3$ or the like, the desired crystal orientation can be accomplished.

The perovskite subbing layer preferably has (001) unidirectional orientation, that is, c-planes unidirectionally oriented parallel to the substrate surface when the crystals are tetragonal, and (100) unidirectional orientation, that is, a-planes unidirectionally oriented parallel to the substrate surface when the crystals are cubic. In either case, the perovskite subbing layer is more preferably an epitaxial film.

The preferred relationship of crystal orientation between the zirconium oxide base layer and the perovskite subbing layer is perovskite (011) // $Zr_{1-x}R_xO_{2-\delta}$ (001) // Si (100) and perovskite [100] // $Zr_{1-x}R_xO_{2-\delta}$ [100] // Si [010]. It is understood that this relationship stands when the respective layers are tetragonal. Even when the respective layers are cubic, the same applies in the sense that axes are preferably parallel to each other within the film plane.

Formation of ferroelectric layer and intermediate oxide layer

The method for forming the ferroelectric layer or intermediate oxide layer is not critical and may be selected from evaporation, sputtering, sol-gel and other methods. Understandably, in order to form the ferroelectric layer or intermediate oxide layer as a unidirectionally oriented film or an epitaxial film, evaporation methods are preferred, with the methods disclosed in U.S. Ser. No. 08/524,904 now U.S. Pat. No. 5,753,934, (Japanese Patent Application No. 219850/1995) and U.S. Ser. No. 08/524,809, now pending, (Japanese Patent Application No. 240607/1995) being especially preferred. Since the ferroelectric layer is a unidirectionally oriented film or an epitaxial film according to the invention, its surface has a high degree of flatness. However, the ferroelectric layer may fail to have a sufficient degree of flatness when it has a particular composition or is formed under particular conditions. In such cases, the ferroelectric layer can be polished on the surface for flattening. For polishing, chemical polishing using alkaline solution, mechanical polishing using colloidal silica, and a combination thereof may be used.

After the ferroelectric layer is polished on the surface, polishing strains are sometimes left. Since the electric characteristics of a ferroelectric material largely vary with stresses, the polishing strains should preferably be removed by optionally annealing the ferroelectric layer. Annealing is preferably carried out at 300 to 850° C., more preferably 400 to 750° C. for 1 second to 30 minutes, more preferably 5 to 15 minutes.

It is noted that the ferroelectric layer may be optionally annealed for improving its ferroelectric characteristics even when no polishing is carried out. In this case, annealing is preferably carried out at higher than 300° C., more preferably higher than 500° C., further preferably higher than 650° C. and lower than 850° C., more preferably lower than 800° C. for 1 second to 30 minutes, more preferably 5 to 15 minutes. Understandably, where a ferroelectric layer is formed relatively thick using lead titanate having a rare earth element added thereto as the ferroelectric material, for example, annealing is preferably done at 300 to 600° C. because too high annealing temperatures do not result in a (001) unidirectionally oriented film, but a mixture of (001) and (100) oriented crystals. Annealing at such relatively low temperatures can form a (001) unidirectionally oriented film.

Electrode layer

In the recording medium of the structure shown in FIG. 4, the electrode layer is disposed between the substrate and the ferroelectric layer. Where the intermediate oxide layer mentioned above is provided, the electrode layer is disposed between the intermediate oxide layer and the ferroelectric layer.

The electrode layer is preferably constructed of metals although it may be constructed of conductive materials other than metals. The electrode layer functions as an electrode under the ferroelectric layer. Since the electrode layer has a lattice matching well with an adjacent layer, a ferroelectric layer with high crystallinity can be deposited thereon.

The metal of which the electrode layer is constructed is preferably an elemental metal selected from Pt, Ir, Os, Re, Pd, Rh and Ru or an alloy containing at least one such metal. The preferred conductive materials other than metals are conductive oxides. Materials containing the following conductive oxides are especially preferred.

NaCl type oxides: TiO, VO, NbO, $RO_{1-x}$ wherein R is at least one rare earth element inclusive of Sc and Y and $0 \leq x < 1$, $LiVO_2$. etc.

Spinel type oxides: $LiTi_2O_4$, $LiM_xTi_{2-x}O_4$ wherein M is Li, Al or Cr and $0 < x < 2$, $Li_{1-x}M_xTi_2O_4$ wherein M is Mg or Mn and $0 < x < 1$, $LiV_2O_4$, $Fe_3O_4$, etc.

Perovskite type oxides: $ReO_3$, $WO_3$, $M_xReO_3$ wherein M is a metal and $0 < x < 0.5$, $M_xWO_3$ wherein M is a metal and $0<x<0.5$, $A_2P_8W_{32}O_{112}$ wherein A is K, Rb or Tl, $Na_xTa_yW_{1-y}O_3$ wherein $0\leq x<1$ and $0<y<1$, $RNbO_3$ wherein R is at least one rare earth element inclusive of Sc and Y, $Na_{1-x}Sr_xNbO_3$ wherein $0\leq x\leq 1$, $RTiO_3$ wherein R is at least one rare earth element inclusive of Sc and Y, $Ca_{n+1}Ti_nO_{3n+1-y}$ wherein n=2, 3, . . . , and 3n+1-y>0, $CaVO_3$, $SrVO_3$, $R_{1-x}Sr_xVO_3$ wherein R is at least one rare earth element inclusive of Sc and Y and $0\leq x\leq 1$, $R_{1-x}Ba_xVO_3$ wherein R is at least one rare earth element inclusive of Sc and Y and $0\leq x\leq 1$, $Sr_{n+1}V_nO_{3n+1-y}$ wherein n=1, 2, 3, . . . , and 3n+1-y>0, $Ba_{n+1}V_nO_{3n+1-y}$ wherein n=1, 2, 3, . . . , and 3n+1-y>0, $R_4BaCu_5O_{13-y}$ wherein R is at least one rare earth element inclusive of Sc and Y and $0\leq 13-y$, $R_5SrCu_6O_{15}$ wherein R is at least one rare earth element inclusive of Sc and Y, $R_2SrCu_2O_{6.2}$ wherein R is at least one rare earth element inclusive of Sc and Y, $R_{1-x}Sr_xVO_3$ wherein R is at least one rare earth element inclusive of Sc and Y, $CaCrO_3$, $SrCrO_3$, $RMnO_3$ wherein R is at least one rare earth element inclusive of Sc and Y, $R_{1-x}Sr_xMnO_3$ wherein R is at least one rare earth element inclusive of Sc and Y and $0\leq x\leq 1$, $R_{1-x}Ba_xO_3$ wherein R is at least one rare earth element inclusive of Sc and Y and $0\leq x\leq 1$, $Ca_{1-x}R_xMnO_{3-y}$ wherein R is at least one rare earth element inclusive of Sc and Y, $0\leq x\leq 1$ and $0\leq 3-y$, $CaFeO_3$, $SrFeO_3$, $BaFeO_3$, $SrCoO_3$, $BaCoO_3$, $RCoO_3$ wherein R is at least one rare earth element inclusive of Sc and Y, $R_{1-x}Sr_xCoO_3$ wherein R is at least one rare earth element inclusive of Sc and Y and $0\leq x\leq 1$, $R_{1-x}Ba_xCoO_3$ wherein R is at least one rare earth element inclusive of Sc and Y and $0\leq x\leq 1$, $RNiO_3$ wherein R is at least one rare earth element inclusive of Sc and Y, $RCuO_3$ wherein R is at least one rare earth element inclusive of Sc and Y, $RNbO_3$ wherein R is at least one rare earth element inclusive of Sc and Y, $Nb_{12}O_{29}$, $CaRuO_3$, $Ca_{1-x}R_xRu_{1-y}Mn_yO_3$ wherein R is at least one rare earth element inclusive of Sc and Y, $0\leq x\leq 1$ and $0\leq y\leq 1$, $SrRuO_3$, $Ca_{1-x}Mg_xRuO_3$ wherein $0\leq x\leq 1$, $Ca_{1-x}Sr_xRuO_3$ wherein $0<x<1$, $BaRuO_3$, $Ca_{1-x}Ba_xRuO_3$ wherein $0<x<1$, $(Ba,Sr)RuO_3$, $Ba_{1-x}K_xRuO_3$ wherein $0<x\leq 1$, $(R,Na)RuO_3$ wherein R is at least one rare earth element inclusive of Sc and Y, $(R,M)RhO_3$ wherein R is at least one rare earth element inclusive of Sc and Y and M is Ca, Sr or Ba, $SrIrO_3$, $BaPbO_3$, $(Ba,Sr)PbO_{3-y}$ wherein $0\leq y<1$, $BaPb_{1-x}Bi_xO_3$ wherein $0<x\leq 1$, $Ba_{1-x}K_xBiO_3$ wherein $0<x\leq 1$, $Sr(Pb,Sb)O_{3-y}$ wherein $0\leq y<1$, $Sr(Pb,Bi)O_{3-y}$ wherein $0\leq y<1$, $Ba(Pb,Sb)O_{3-y}$ wherein $0\leq y<1$, $Ba(Pb,Bi)O_{3-y}$ wherein $0\leq y<1$, $MMoO_3$ wherein M is Ca, Sr or Ba, $(Ba,Ca,Sr)TiO_{3-x}$ wherein $0\leq 3-x$, etc.

Layer perovskite type oxides inclusive of $K_2NiF_4$ type: $R_{n+1}Ni_nO_{3n+1}1$ wherein R is at least one member selected from Ba, Sr, and rare earth elements inclusive of Sc and Y and n is an integer of 1 to 5, $R_{n+1}CU_nO_{3n+1}$ wherein R is at least one member selected from Ba, Sr, and rare earth elements inclusive of Sc and Y and n is an integer of 1 to 5, $Sr_2RuO_4$, $Sr_2RhO_4$, $Ba_2RuO_4$, $Ba_2RhO_4$, etc.

Pyrochlore type oxides: $R_2V_2O_{7-y}$ wherein R is at least one rare earth element inclusive of Sc and Y and $0\leq y<1$, $Tl_2Mn_2O_{7-y}$ wherein $0\leq y<1$, $R_2Mo_2O_{7-y}$ wherein R is at least one rare earth element inclusive of Sc and Y and $0\leq y<1$, $R_2Ru_2O_{7-y}$ wherein R is at least one member selected from Tl, Pb, Bi, and rare earth elements inclusive of Sc and Y and $0\leq y<1$, $Bi_{2-x}Pb_xPt_{2-x}RU_xO_{7-y}$ wherein $0\leq x\leq 2$ and $0\leq y<1$, $Pb_2(Ru,Pb)O_{7-y}$ wherein $0\leq y<1$, $R_2Rh_2O_{7-y}$ wherein R is at least one member selected from Tl, Pb, Bi, Cd, and rare earth elements inclusive of Sc and Y and $0\leq y<1$, $R_2Pd_2O_{7-y}$ wherein R is at least one member selected from Tl, Pb, Bi, Cd, and rare earth elements inclusive of Sc and Y and $0\leq y<1$, $R_2Re_2O_{7-y}$ wherein R is at least one member selected from Tl, Pb, Bi, Cd, and rare earth elements inclusive of Sc and Y and $0\leq y<1$, $R_2Os_2O_{7-y}$ wherein R is at least one member selected from Tl, Pb, Bi, Cd, and rare earth elements inclusive of Sc and Y and $0\leq y<1$, $R_2Ir_2O_{7-y}$ wherein R is at least one member selected from Tl, Pb, Bi, Cd, and rare earth elements inclusive of Sc and Y and $0\leq y<1$, $R_2Pt_2O_{7-y}$ wherein R is at least one member selected from Tl, Pb, Bi, Cd, and rare earth elements inclusive of Sc and Y and $0\leq y<1$, etc.

Other oxides: $R_4Re_6O_{19}$ wherein R is at least one rare earth element inclusive of Sc and Y, $R_4Ru_6O_{19}$ wherein R is at least one rare earth element inclusive of Sc and Y, $Bi_3Ru_3O_{11}$, $V_2O_3$, $Ti_2O_3$, $Rh_2O_3$, $VO_2$, $CrO_2$, $NbO_2$, $MoO_2$, $WO_2$, $ReO_2$, $RuO_2$, $RhO_2$, $OSO_2$, $IrO_2$, $PtO_2$, $PdO_2$, $V_3O_5$, $V_nO_{2n-1}$ wherein n is an integer of 4 to 9, $SnO_{2-x}$ wherein $0\leq x<1$, $La_2Mo_2O_7$, (M,Mo)O wherein M is Na, K, Rb or Tl, $Mo_nO_{3n-1}$ wherein n is 4, 8, 9 or 10, $Mo_{17}O_{47}$, $Pd_{1-x}Li_xO$ wherein $0<x\leq 0.1$, etc. In-containing oxides.

Especially preferred among these are In-containing oxides and conductive perovskite oxides. Especially preferred are $In_2O_3$, Sn-doped $In_2O_3$, $RCoO_3$, $RMnO_3$, $RNiO_3$, $R_2CuO_4$, $(R,Sr)CoO_3$, $(R,Sr,Ca)RuO_3$, $(R,Sr)RuO_3$, $SrRuO_3$, $(R,Sr)MnO_3$ wherein R is a rare earth element inclusive of Sc and Y, and related compounds thereof.

When it is desired to form a ferroelectric layer of (001) orientation, the electrode layer should preferably be of tetragonal (001) unidirectional orientation or cubic (100) unidirectional orientation. When it is desired to form a ferroelectric layer of hexagonal (0001) orientation, the electrode layer should preferably be of (111) unidirectional orientation. In either case, the electrode layer is more preferably an epitaxial film.

Where it is desired to form an electrode layer of tetragonal (001) orientation or cubic (100) orientation, the intermediate oxide layer should preferably be of (001) orientation. Where it is desired to form an electrode layer of (111) orientation, the intermediate oxide layer should preferably be of (111) orientation. It is noted that an electrode layer of (111) orientation can be formed on the intermediate oxide layer of (001) orientation where the electrode layer is constructed of a metal. In order to ensure that the electrode layer is of (001) orientation where the electrode layer is constructed of a metal, a perovskite subbing layer as previously mentioned is preferably provided.

The preferred relationship of crystal axis orientation among the silicon single crystal substrate, the electrode layer and the ferroelectric layer is perovskite or tungsten bronze [100] // electrode layer [100] // Si [010]. The preferred plane orientation relationship is perovskite or tungsten bronze (001) // electrode layer (001) // Si (100). It is understood that this relationship stands when the electrode layer is tetragonal. Even when the electrode layer is cubic, the same applies in the sense that axes are preferably parallel to each other within the film plane.

The electrode layer preferably has a resistivity of $10^{-7}$ to $10^{-2}$ $\Omega$cm. Also the electrode layer may be constructed of a superconductor material.

No particular limit is imposed on the method of forming the electrode layer and any of evaporation, sputtering and other methods may be used, with the evaporation method being preferred. In order that the electrode layer be a unidirectionally oriented film or epitaxial film as mentioned above, the methods disclosed in the previously cited Japanese Patent Application Nos. 219850/1995, 240607/1995, and 186625/1996 are preferably used.

Crystallinity, surface flatness and thickness of layers

Various layers constituting the intermediate oxide layer and the electrode layer should preferably have good crystallinity and a flat surface as evaluated on the molecular level for the purpose of improving the crystallinity of a layer to be formed thereon. Also, the ferroelectric layer should preferably have high crystallinity and a flat surface for the aforementioned reason.

The respective layers can be evaluated for crystallinity in terms of a half-value width of a rocking curve of reflection peak in X-ray diffractometry (XRD) and the pattern of a RHEED image. The surface flatness can be evaluated in terms of streakiness of a RHEED image and surface roughness (ten point mean roughness) as measured by AFM.

Preferably, the ferroelectric layer, electrode layer and intermediate oxide layer have such crystallinity that a rocking curve of reflection on a (002) plane upon X-ray diffraction has a half-value width of less than 1.50°. Also preferably, the surface roughness (ten point mean roughness) Rz as measured by AFM across a reference length of 500 nm is less than 2 nm, especially less than 0.60 nm for the intermediate oxide layer, less than 10 nm for the electrode layer, and less than 2 nm, especially less than 0.60 nm for the ferroelectric layer. It is desired that such a surface roughness be available over a region of more than 80%, more preferably more than 90%, especially more than 95% of the surface of each layer. The above-described surface roughness is a value obtained by carrying out measurement at arbitrary 10 or more points evenly distributed over an area of at least 10 cm² of a layer formed over the entire surface of a substrate. In the specification, a surface roughness Rz of less than 2 nm over a region of more than 80% of the thin film surface means that when surface roughness is measured at 10 or more points, Rz is less than 2 nm at more than 80% of the measurement points. It is noted that the surface roughness Rz is prescribed in JIS B-0610.

With respect to the half-value width of a rocking curve and Rz, no particular lower limit values need be determined while smaller values are preferred. At the present, the lower limit of the half-value width of a rocking curve is about 0.7°, especially about 0.4° and the lower limit of Rz is about 0.10 nm.

Also, a RHEED image which is streaky and sharp indicates that the relevant layer has improved crystallinity and surface flatness.

In general, the electrode layer preferably has a thickness of about 50 to about 500 nm. The electrode layer should preferably be thin to such an extent that its crystallinity and surface flatness are not impaired.

In general, the intermediate oxide layer preferably has a thickness of 5 to 500 nm, more preferably 10 to 50 nm. The intermediate oxide layer should preferably be thin to such an extent that its crystallinity and surface flatness are not impaired. Where the intermediate oxide layer is used as an insulating layer, its thickness is preferably about 50 to about 500 nm. It is noted that where the intermediate oxide layer is of multilayer structure, the respective sub-layers should preferably have a thickness of more than 0.5 nm and the total thickness of the sub-layers should preferably fall in the above-mentioned range.

Figure 5:
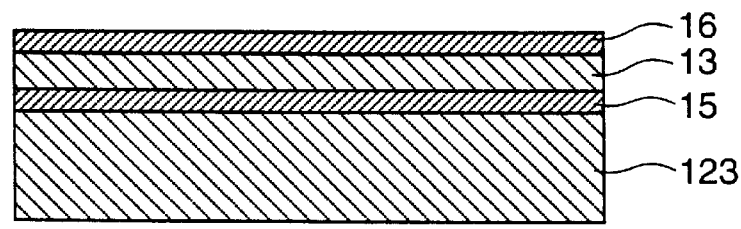
FIG. 5 is a cross-sectional view of one exemplary construction of the recording medium having a protective layer according to the invention.

Further, the recording medium of the invention may have a protective layer formed on the ferroelectric layer. FIG. 5 shows a construction similar to that of FIG. 4, but having a protective layer 16 on the ferroelectric layer 13.

The provision of a protective layer having a relatively high hardness prevents the ferroelectric layer on its surface from mechanical damages by collision of the probe or the like. The materials of which the protective layer is formed are preferably harder materials such as $ZrO_2$, stabilized zirconia (e.g., YSZ), TiC, TiN, Ti(C,N,O), CrC, CrN, SiC, $Si_3N_4$, cubic boron nitride (CBN), ZrN, HfN, (Ti,Al)N, (Ti,Zr)N, (Ti,Nb)N, (Ti,Hf)N, WC, $W_2C$, $Al_2O_3$, and composite materials thereof. Besides, diamond-like carbon (DLC) having very high hardness is also preferred.

The protective layer preferably has a thickness of about 1 to about 100 nm. A too thin protective layer would provide insufficient protection on the surface of the ferroelectric layer. The protective layer improves its surface flatness as its thickness increases. If the protective layer becomes too thick, a greater voltage would be required for writing and weaker capacitive signals be read out.

The protective layer with adequate conductivity not only exerts the above-mentioned protective effect, but also renders the charge distribution on the ferroelectric layer surface uniform for thereby preventing the concentration of electric charge which can locally occur on the ferroelectric layer surface owing to the pyroelectric effect and crystal defects of the ferroelectric material. Accordingly, the noise and probe failure by the charge concentration can be prohibited. In this regard, the protective layer preferably has a resistivity in the range of 10 to $10^7$ Ωcm, especially 100 to $10^7$ Ωcm although the resistivity varies with the thickness of the protective layer. With a too low resistivity, the writing voltage would be applied outside the region scanned with the conductive probe, increasing the size of bits and reducing the contrast of bits upon writing. With a too high resistivity, the above-mentioned effect of preventing charge concentration would become insufficient.

Nevertheless, conductive materials having a resistivity of less than 10 Ωcm, for example, Pt can be used as the protective. layer material if the thickness of the protective layer is preferably decreased to 0.5 to 10 nm, more preferably 1 to 2 nm to mitigate the influence of resistivity on the bit size and bit contrast upon writing.

Exemplary of the material having high hardness and adequate conductivity are materials containing boron (B) and silicon (Si) and/or phosphorus (P) as a major component. Highly insulating materials can be given adequate conductivity by doping them with appropriate elements. For example, DLC can be given an adequate conductivity along with the very high hardness by doping it with boron (B).

It is understood that besides the above-mentioned method of forming a conductive protective layer, a method of treating the surface of a ferroelectric layer to be conductive may be used to prevent the concentration of electric charge. One exemplary conductive treatment is a treatment of the ferroelectric layer surface to form electrons or holes, that is, treatment to form a surface energy level. Such treatment may be done, for example, by a method of evaporating a conductive metal such as Pt to deposit the metal in atomic unit on the ferroelectric layer surface.

The protective layer may be constructed of either crystallizing materials or amorphous materials. Amorphous films are preferred to crystallized films because the amorphous films present a flatter surface on the molecular level to reduce noise and enable high-speed operation.

The alternative structure of the recording medium having such a protective layer and the recording/retrieving method therefor are the same as in the embodiment without a protective layer.

Figure 6:
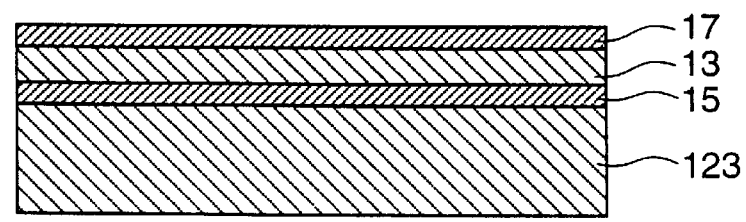
FIG. 6 is a cross-sectional view of one exemplary construction of the recording medium having a lubricating layer according to the invention.

The recording medium of the invention may further have a lubricating layer on the ferroelectric layer or the protective layer. FIG. 6 illustrates a construction similar to that of FIG. 4, but having a lubricating layer 17 on the ferroelectric layer 13.

The provision of the lubricating layer protects the medium surface from mechanical damages.

The material of the lubricating layer 17 may be any of solid, liquid and gas materials. The solid materials having high lubricity include saturated fatty acids such as stearic acid, dyes such as phthalocyanine, polymers such as fluororesins, carbon, $MoS_2$, and inorganic materials such as cobalt and chromium oxides. The liquid materials having high lubricity include water, organic solvents, fluorinated polymers, perfluoropolyethers, silicon compounds, aliphatic esters, and fluid paraffin.

Depending on the resistivity of a lubricating material used, the lubricating layer also exerts the same effect as the above-mentioned protective layer.

In general, the lubricating layer preferably has a thickness of less than about 100 nm. If the lubricating layer becomes too thick, a greater voltage would be required for writing and weaker capacitive signals be read out. The lubricating layer may be thin although it is usually thicker than about 5 nm when formed as a continuous film. Instead of the lubricating layer in the form of a continuous film, the surface of the ferroelectric layer may be lubricated. The lubricating treatment includes, for example, plasma treatment of the ferroelectric layer surface with a fluorine-containing gas and adsorption of stearic acid by the ferroelectric layer surface.

It is noted that a layer of lubricating liquid may have a thickness in excess of 100 nm. In this case, the probe is submerged in the liquid film on the medium for detecting signals within the liquid. Therefore, in an extreme case, the information processing apparatus may have the medium and the probe contained in a lubricating liquid. This situation is the same as STM observation in liquid.

Preferred gaseous materials having high lubricity are air, helium, argon and subatmospheric gases. Most liquid and gas materials having high lubricity, especially gas materials do not form a static layer structure.

However, as will be described later, in the information processing apparatus adapted to detect bits in the recording medium with the probe mounted on a flying slider while rotating the recording medium, for example, a space is formed between the medium and the probe during operation, leading to the situation that a gas layer is formed on the ferroelectric layer in a substantial sense. Such a gas layer is also encompassed in the lubricating layer used in the present invention.

The alternative structure of the recording medium having such a lubricating layer and the recording/retrieving method therefor are the same as in the embodiment without a lubricating layer.

Figure 7:
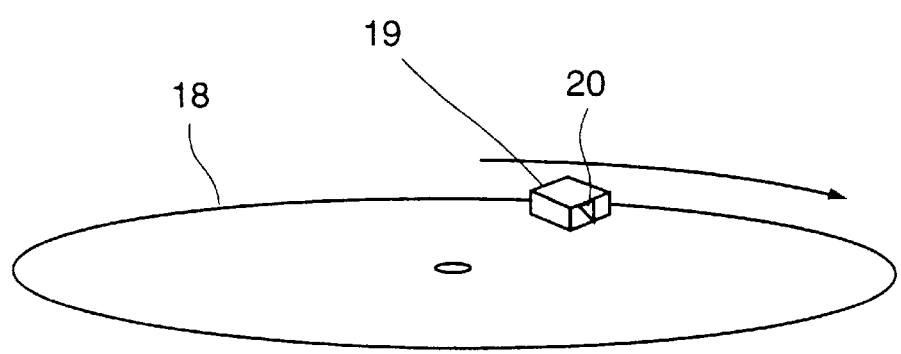
FIG. 7 is a perspective view illustrating one exemplary construction including a probe mounted on a flying slider in the information processing apparatus according to the invention and a recording medium section.

In connection with the lubricating layer in the present invention, one modification is to form a lubricating gas layer on the ferroelectric layer of the recording medium by mounting the probe on a flying slider. One exemplary construction is shown in FIG. 7. In FIG. 7, a lubricating gas layer is formed by mounting a probe 20 on a flying slider 19 and rotating a recording medium 18 relative to the probe. In this embodiment, a space is formed between the recording medium 18 and the probe 20, leading to the situation that a lubricating gas layer is formed on the ferroelectric layer in a substantial sense.

Figure 8:
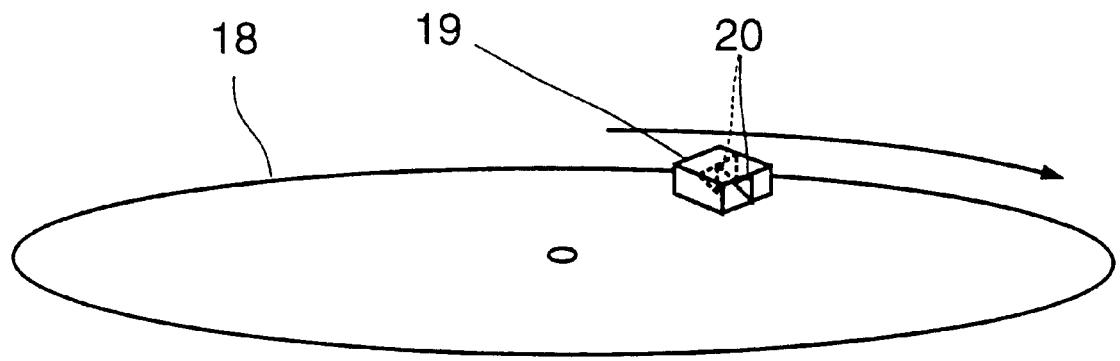
FIG. 8 is a perspective view illustrating another exemplary construction including a probe mounted on a flying slider in the information processing apparatus according to the invention and a recording medium section.

It is noted that as shown in FIG. 8, a plurality of (usually 2 to $10^4$) probes 20 may be mounted on the flying slider 19.

Figure 9:
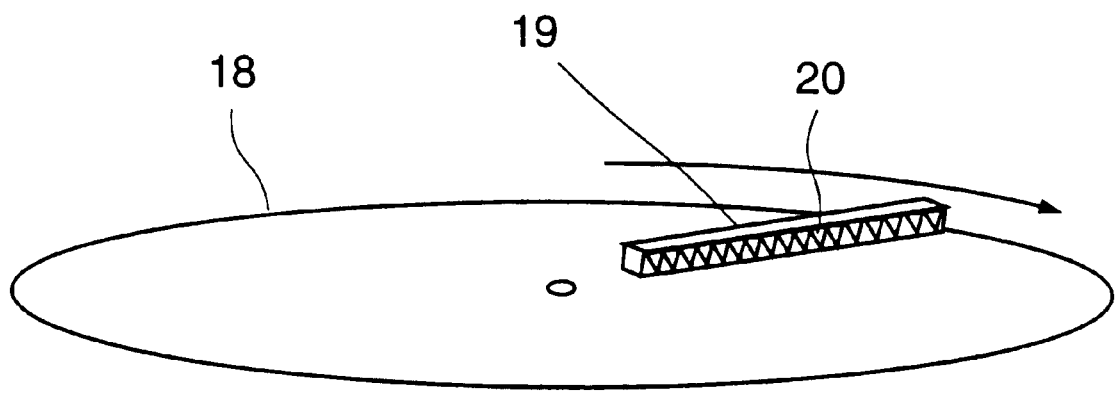
FIG. 9 is a perspective view illustrating a further exemplary construction including a probe mounted on a flying slider in the information processing apparatus according to the invention and a recording medium section.

Further, as shown in FIG. 9, a plurality of (usually 2 to $10^4$) probes 20 may be mounted on the flying slider 19 and arranged on a radial line of the rotating circular medium.

In FIGS. 7 to 9, the probes are preferably scanning capacitive microscope (SCaM) probes.

The rotating medium generally has a diameter of about 10 mm to about 20 cm and can bear information in a quantity of about 50 to about 5,000 megabytes on either surface.

If such a structure is constructed in air, a space of about 100 nm is formed as in the case of a flying slider of a magnetic head, leading to the situation that a lubricating gas layer is dynamically formed on the recording medium. The thickness of the lubricating gas layer, that is, the distance between the probe and the medium surface depends, of course, on the shape of the slider and largely on the type, especially viscosity of a gas. Therefore, if the medium and the slider are contained in a subatmospheric gas, the distance can be reduced to about 10 nm. Note that the subatmospheric gas preferably has a pressure of more than $10^{-3}$ Torr because floating of the slider becomes difficult under a too low pressure. The gas is preferably helium and argon as well as air.

It is understood that the flying slider can be used not only in gas, but also in liquid. In this case, a lubricating layer of liquid intervenes between the probe and the medium. On use in liquid, the revolution of the medium is slower than in gas.

Such a construction utilizing a lubricating layer of gas or liquid achieves the same effect as achieved by treating the ferroelectric layer surface to be lubricative. There is obtained an information processing apparatus with sufficiently high reliability to withstand repetitive data rewriting.

Understandably, the protective layer and the lubricating layer may be used in combination. In this embodiment, the lubricating layer is generally formed on the protective layer. Further, the protective layer and the lubricating layer each may be of multilayer structure.

Using the recording medium of the invention as an AFM or STM memory, a noiseless information processing apparatus with sufficiently high reliability to withstand repetitive data rewriting is obtained. Scanning can be carried out by rotating the recording medium in the form of a disc, or driving the medium by means of an actuator, or by driving the probe by means of an actuator. In addition to the AFM or STM memory, the recording medium of the invention will find further applications as media in storage apparatus utilizing the principle of SCaM.

EXAMPLE

Examples of the invention are given below by way of illustration.

Example 1

An information processing apparatus was manufactured as shown in FIG. 1.

The recording medium with which the information processing apparatus was loaded was manufactured as follows by the method of U.S. Ser. No. 08/524,904 and 08/524,809.

A silicon single crystal wafer which was cut so as to make (111) plane a surface and mirror polished was used as the single crystal substrate on which an oxide thin film was to be grown. After purchase, the mirror surface was cleaned by etching with a 40% ammonium fluoride aqueous solution. The silicon substrate used was a disc substrate having a diameter of 2 inches.

The single crystal substrate was secured to a substrate holder equipped with rotating and heating mechanisms installed in a vacuum chamber. The vacuum chamber was then evacuated to a vacuum of $10^{-6}$ Torr by means of an oil diffusion pump. In order to protect the cleaned surface of the substrate with silicon oxide, the substrate was rotated at 20 rpm and heated at 600° C. while introducing oxygen to the proximity of the substrate from a nozzle at a rate of 25 cc/min. A silicon oxide film was formed on the substrate surface by thermal oxidation. By this procedure, a silicon oxide film of about 1 nm thick was formed.

Thereafter, the substrate was heated at 900° C. and rotated. The number of revolutions was 20 rpm. At this point, oxygen gas was introduced from a nozzle at a rate of 25 cc/min. Metallic Zr was evaporated from its source to supply zirconium onto the substrate in an amount corresponding to a zirconium oxide film thickness of 5 nm, yielding a surface treated silicon substrate having a 1×1 surface structure.

By further supplying metallic Zr from its source onto the surface treated silicon substrate which was at a temperature of 900° C. and rotating at 20 rpm while introducing oxygen gas from a nozzle at a rate of 25 cc/min., a $ZrO_2$ film was formed on the treated substrate.

Subsequently, the substrate having $ZrO_2$ formed thereon was heated at 900° C. and rotated. The number of revolutions was 20 rpm. At this point, oxygen gas was introduced from a nozzle at a rate of 25 cc/min. and metallic Mn and metallic Ho were evaporated from their sources to form a $HoMnO_3$ film on the substrate. The feed rate ratio Ho/Mn of metallic Ho to metallic Mn was controlled to 1.0 in molar ratio.

In this way, there was obtained (1) a recording medium of $Si(111)/ZrO_2(111)$ (50 nm)/$HoMnO_3(0001)$ (100 nm) epitaxial structure.

Separately, a silicon single crystal wafer which was cut so as to make (100) plane a surface and mirror polished was used as the single crystal substrate on which an oxide thin film was to be grown. After purchase, the mirror surface was cleaned by etching with a 40% ammonium fluoride aqueous solution. The silicon substrate used was a disc substrate having a diameter of 2 inches.

The single crystal substrate was secured to a substrate holder equipped with rotating and heating mechanisms installed in a vacuum chamber. The vacuum chamber was then evacuated to a vacuum of $10^{-6}$ Torr by means of an oil diffusion pump. In order to protect the cleaned surface of the substrate with silicon oxide, the substrate was rotated at 20 rpm and heated at 600° C. while introducing oxygen to the proximity of the substrate from a nozzle at a rate of 25 cc/min. A silicon oxide film was formed on the substrate surface by thermal oxidation. By this procedure, a silicon oxide film of about 1 nm thick was formed.

Thereafter, the substrate was heated at 900° C. and rotated. The number of revolutions was 20 rpm. At this point, oxygen gas was introduced from a nozzle at a rate of 25 cc/min. Metallic Zr was evaporated from its source to supply zirconium onto the substrate in an amount corresponding to a zirconium oxide film thickness of 5 nm, yielding a surface treated silicon substrate having a 1×1 surface structure.

By further supplying metallic Zr from its source onto the surface treated silicon substrate which was at a temperature of 900° C. and rotating at 20 rpm while introducing oxygen gas from a nozzle at a rate of 25 cc/min., a $ZrO_2$ film was formed on the treated substrate.

The substrate having a $ZrO_2$ film thus formed thereon was used as the evaporation substrate. On the evaporation substrate heated at 900° C. and rotated at 20 rpm, oxygen gas was introduced from a nozzle at a rate of 25 cc/min. and metallic Ba and metallic Ti were evaporated from their sources in a molar ratio of 1:1. A $BaTiO_3$ film was formed on the evaporation substrate. At the initial stage of deposition, only Ti was fed in an amount corresponding to a $TiO_2$ film thickness of 0.5 nm. Then a film of 2 nm thick was formed at a deposition rate of 0.05 nm/s and film formation was continued at an increased deposition rate of 0.2 nm/s.

In this way, there was obtained (2) a recording medium of $Si(100)/ZrO_2(001)$ (50 nm)/$BaTiO_3(001)$ (300 nm) epitaxial structure.

By the same procedure as recording medium (1) except that at the end of formation of $ZrO_2$ film, a Pt film was formed by evaporating metallic Pt without introducing oxygen, there was manufactured (3) a recording medium of $Si(111)/ZrO_2(111)$ (50 nm)/$Pt(111)$ (100 nm)/$HoMnO_3$ (0001) (100 nm) epitaxial structure.

Figure 10:
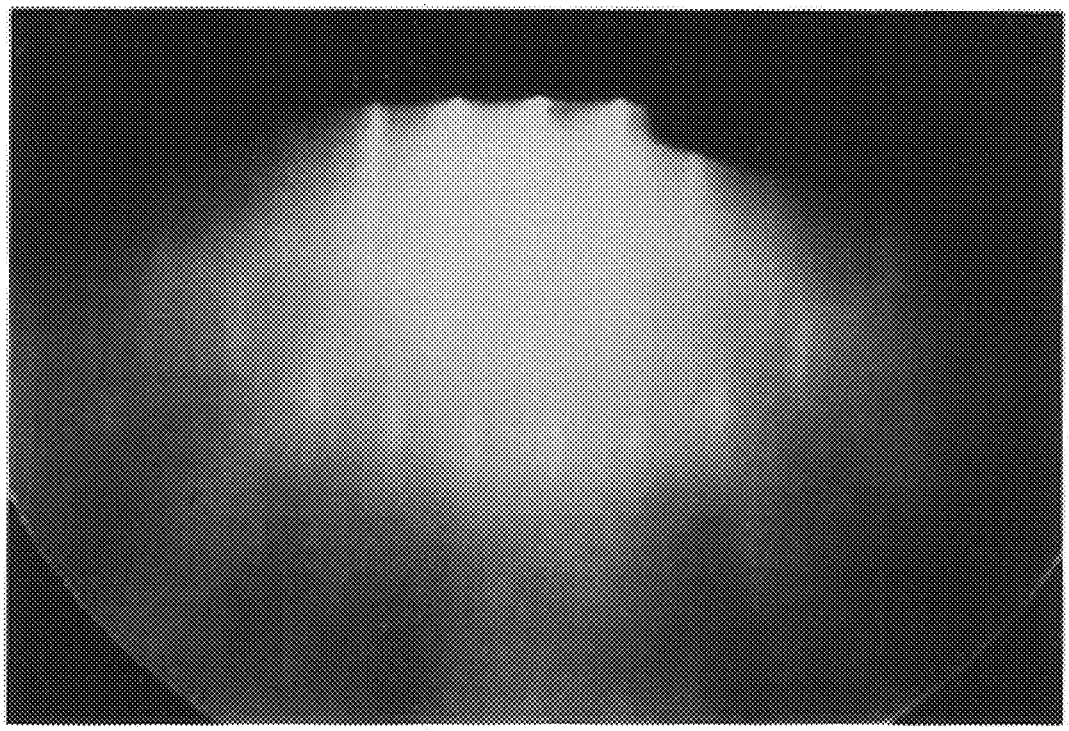
FIG. 10 is a drawing-substituting photograph showing the surface crystalline structure at the surface of a recording medium of Si(111)/ZrO$_2$(111)/HoMnO$_3$(0001) epitaxial structure, illustrating a RHEED pattern obtained when an electron beam is incident from [110] direction of the silicon single crystal substrate.
Figure 11:
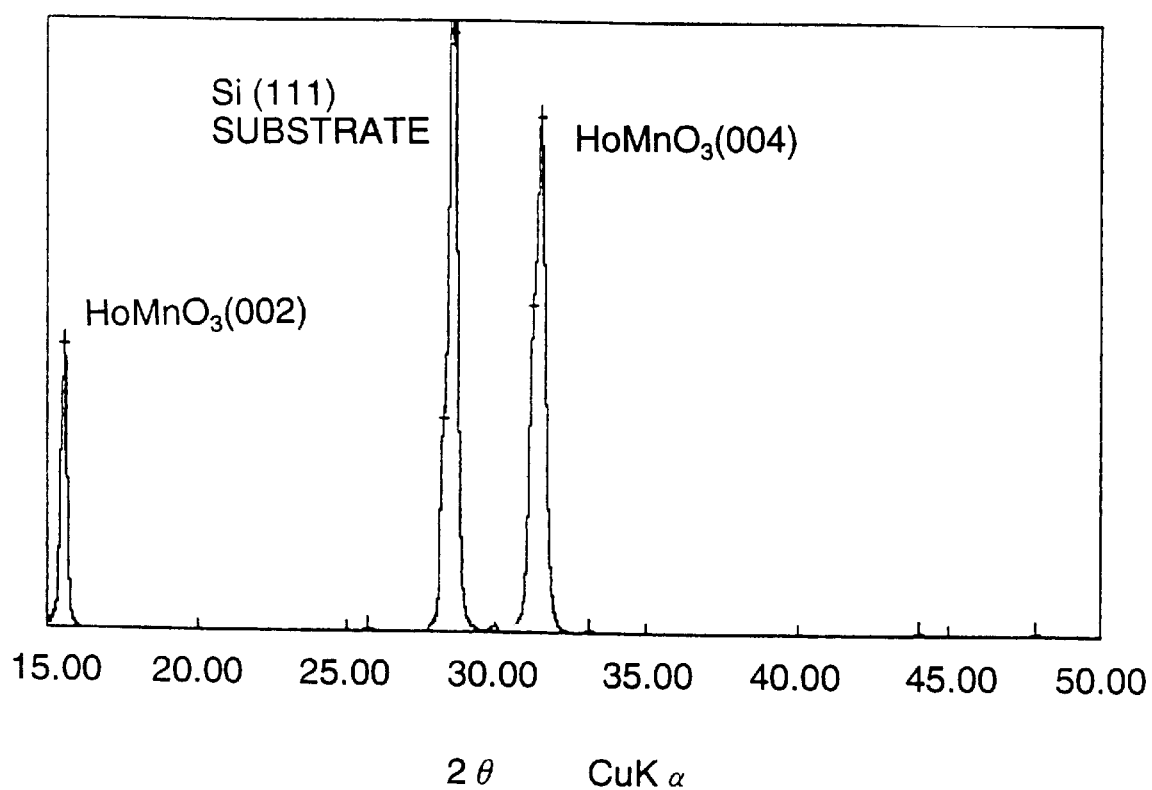
FIG. 11 is a 2θ-θ X-ray diffraction diagram of the Si(111)/ZrO$_2$(111)/HoMnO$_3$(0001) epitaxial structure.
Figure 12:
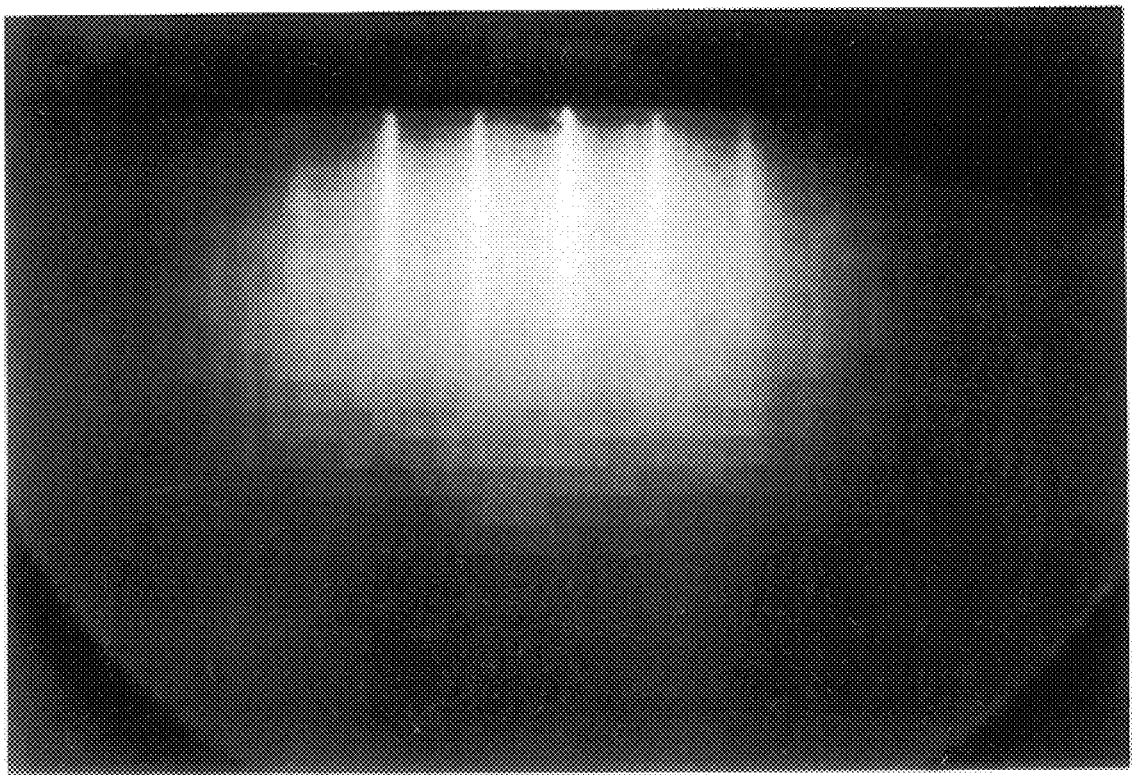
FIG. 12 is a drawing-substituting photograph showing the surface crystalline structure at the surface of a recording medium of Si(001)/ZrO$_2$(001)/BaTiO$_3$(001) epitaxial structure, illustrating a RHEED pattern obtained when an electron beam is incident from [110] direction of the silicon single crystal substrate.
Figure 13:
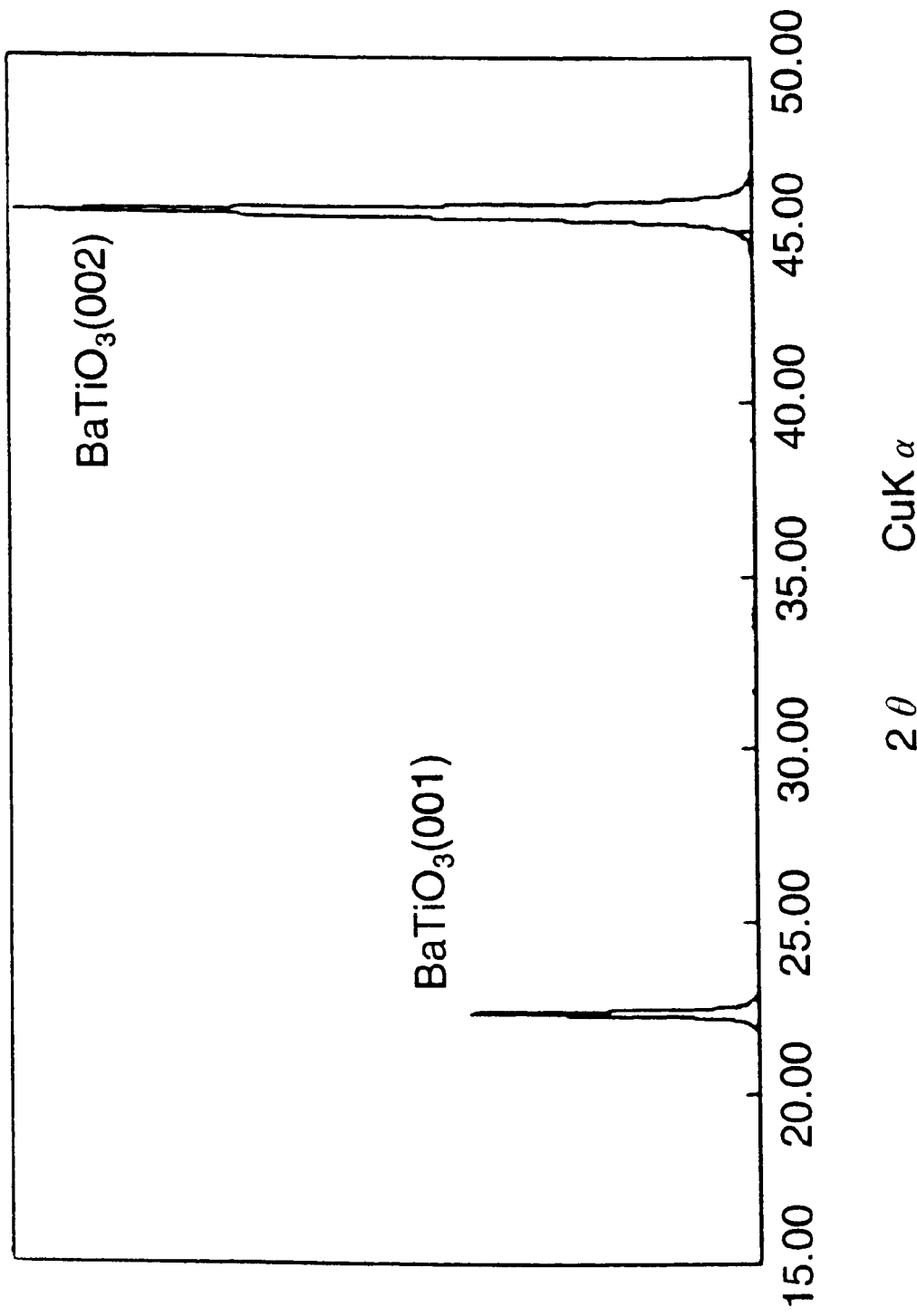
FIG. 13 is a 2θ-θ X-ray diffraction diagram of the Si(001)/ZrO$_2$(001)/BaTiO$_3$(001) epitaxial structure.

As the Si (111) substrate in recording medium (1), a semiconductor silicon substrate of p type and 5 Ωcm was used in order to form a depletion layer in the silicon by the polarized charge for the purpose of increasing the magnitude of signals, and an ohmic electrode of Al was formed on the back surface for tapping out the electrode on the recording medium side. The silicon substrate in recording medium (2) was of 0.01 Ωcm and itself served as an electrode of the recording medium. In recording medium (3), the Pt film was an electrode of the medium and a lead was tapped to the electrode. The resulting recording media on the surface were measured for ten point mean roughness Rz (reference length L=500 nm) according to JIS B-0610, finding an Rz value of 0.42 nm on the average, 1.5 nm at the maximum, and 0.14 nm at the minimum for recording medium (1); 0.50 nm on the average, 1.25 nm at the maximum, and 0.35 nm at the minimum for recording medium (2); and 0.32 nm on the average, 1.3 nm at the maximum, and 0.2 nm at the minimum for recording medium (3). For all media (1), (2) and (3), Rz was less than 0.6 nm at more than 80% of the measurement points. By X-ray diffractometry and RHEED, the ferroelectric layers of media (1), (2) and (3) were found to be epitaxial films. For medium (1), a RHEED pattern of its surface is shown in FIG. 10 and the result of X-ray diffraction is shown in FIG. 11. For medium (2), a RHEED pattern of its surface is shown in FIG. 12 and the result of X-ray diffraction is shown in FIG. 13.

Using the information processing apparatus constructed as above, recording/retrieving operation was carried out on media (1), (2) and (3). First, a DC bias voltage of 10 volts was applied across the recording surface of the medium to align polarization directions. Recording was carried out by applying a voltage of −10 volts at intervals of 50 nm to effect polarization reversal. Thereafter, read-out was performed using a capacitive sensor, obtaining signals corresponding to bits. For comparison purposes, a recording medium using a polycrystalline ferroelectric material having surface irregularities of more than 50 nm was evaluated. To provide an apparent rating, signals delivered from the apparatus of FIG. 1 were imaged to observe the shape of written bits. In the polycrystalline recording medium of the prior art, bits were of irregular shapes such as star and rod shapes. That is, the written bits had been deformed by noise. In the media according to the invention, bits were circular. The size of bits decreased in the order of media (1), (2) and (3). In medium (3), the bits had a diameter of about 60 nm. It was thus confirmed that the present invention prevents recorded bits from being deformed by noise and thus ensures stable storage and retrieval.

Example 2

By the same procedure as the recording media in Example 1, there were manufactured (4) a recording medium of $Si(100)/Y_2O_3(111)$ (50 nm)/$HoMnO_3(0001)$ (100 nm) epitaxial structure, (5) a recording medium of $Si(100)/ZrO_2(001)$ (50 nm)/$Pt(111)$ (100 nm)/$HoMnO_3(0001)$ (100 nm) epitaxial structure, (6) a recording medium of Si(111)/Y$_2$O$_3$(111) (50 nm)/Pt(111) (100 nm)/HoMnO$_3$(0001) (100 nm) epitaxial structure, and (7) a recording medium of Si(100)/ZrO$_2$(001) (50 nm)/BaTiO$_3$(001) (100 nm)/Pt(001) (100 nm)/BaTiO$_3$(001) (100 nm) epitaxial structure.

As the Si (111) substrate in recording medium (4), a semiconductor silicon substrate of p type and 5 Ωcm was used in order to form a depletion layer in the silicon by the polarized charge for the purpose of increasing the magnitude of signals, and an ohmic electrode of Al was formed on the back surface for tapping out the electrode on the recording medium side. In recording media (5), (6) and (7), the Pt layer was an electrode of the medium and a lead was tapped to the electrode. The resulting recording media on the surface were measured for ten point mean roughness Rz (reference length L=500 nm) according to JIS B-0610, finding an Rz value of 0.55 nm on the average, 1.5 nm at the maximum, and 0.13 nm at the minimum for recording medium (4); 0.43 nm on the average, 1.4 nm at the maximum, and 0.3 nm at the minimum for recording medium (5); 0.40 nm on the average, 1.2 nm at the maximum, and 0.3 nm at the minimum for recording medium (6); and 0.37 nm on the average, 1.5 nm at the maximum, and 0.2 nm at the minimum for recording medium (7). For all media (4), (5), (6) and (7), Rz was less than 0.6 nm at more than 80% of the measurement points. By X-ray diffractometry and RHEED, the ferroelectric layers of media (4) to (7) were found to be epitaxial films.

As in Example 1, recording/retrieving operation was carried out on media (4) to (7) using the aforementioned information processing apparatus, finding that bits were circular. The size of bits decreased in the order of media (4), (5), (6) and (7). In medium (6), the bits had a diameter of about 60 nm. It was thus confirmed that the present invention prevents recorded bits from being deformed by noise and thus ensures stable storage and retrieval.

Example 3

A recording medium (3-A) was manufactured by further forming a protective layer of DLC to a thickness of 5 nm on recording medium (3) of Example 1 as shown in FIG. 5. This protective layer was formed by a cathode coupling technique using plasma CVD. The recording medium was prepared by introducing a gas mixture of CH$_4$+H$_2$ under a pressure of 1×10$^{-1}$ Torr into a vacuum chamber, supplying an RF power of 200 watts, and depositing at room temperature. It was previously found that in a sample having a protective layer of DLC formed to a thickness of 100 nm, the DLC protective layer was an amorphous insulator.

As in Example 1, recording/retrieving operation was carried out on media (3-A) and (3). After 105 cycles of retrieval, the bits were examined for shape. For medium (3) wherein no DLC protective layer was formed, it was found that despite the circular shape of bits, a contrast developed from the edge to the center of bits and the periphery of bits was extinct. As a result of the extinction of the periphery of bits, signals are reduced in intensity to disable retrieval. In regions outside the bits, the noise which was probably caused by contact with the probe was found. In contrast, in medium (3-A) of this example, bits were circular and remained unchanged from the shape they assumed immediately after recording. No noise was found in regions outside the bits, indicating that the medium was resistant to mechanical damages as by probe collision.

Example 4

A recording medium (3-B) was manufactured by further forming a protective layer containing B, P and Si to a thickness of 10 nm on recording medium (3) of Example 1 as shown in FIG. 5. This protective layer was formed by a glow discharge decomposition or plasma decomposition technique. The recording medium was prepared by introducing BH$_3$, PH$_3$ and SiH$_4$ in a proportion of 10:3:7 (molar ratio) as source gases and hydrogen as a carrier into a vacuum chamber under a pressure of 0.2 Torr, supplying an RF power of 300 watts, and depositing at room temperature. It was previously found that in a sample having a protective layer of the same composition formed to a thickness of 200 nm, the protective layer was amorphous and had a resistivity of 5×10$^6$ Ωcm. The protective layer had a composition represented by a molar ratio B:P:Si of 10:3.25:8.03 as determined by X-ray fluorescence analysis.

As in Example 1, recording/retrieving operation was carried out on media (3-B) and (3). Satisfactory write and read operation was confirmed. After 10$^9$ cycles of retrieval on medium (3) without a protective layer, the AFM probe was observed to find failure of its tip. In contrast, in medium (3-B) of this example, the AFM probe remained unchanged even after 109 cycles of retrieval, ensuring stable read operation. It is believed that the failure of the probe occurred as a result of electric charge locally concentrating on the surface of the ferroelectric layer due to the pyroelectric effect and crystal defects of the ferroelectric material. The protective layer of this example is effective for dispersing the charge which would otherwise locally concentrate.

Example 5

A recording medium (3-C) was manufactured by further forming a lubricating layer of phthalocyanine as a solid lubricant to a thickness of 5 nm on recording medium (3) of Example 1 as shown in FIG. 6. The phthalocyanine film was formed by using an evaporation chamber, evaporating phthalocyanine through resistive heating, and depositing at room temperature.

As in Example 1, recording/retrieving operation was carried out on media (3-C) and (3). After 105 cycles of retrieval, the bits were examined for shape. For medium (3) without a lubricating layer, it was found as in Example 3 that despite the circular shape of bits, a contrast developed from the edge to the center of bits and the periphery of bits was extinct. In regions outside the bits, the noise which was probably caused by contact with the probe was found. In contrast, in medium (3-C) of this example, bits were circular and remained unchanged from the shape they assumed immediately after recording. No noise was found in regions outside the bits, indicating that the medium was resistant to mechanical damages as by probe collision.

Example 6

A recording medium (3-D) was manufactured by dipping recording medium (3) of Example 1 in a fluorinated fluid. At this point, the medium was coated on the surface with a fluid layer of about 2 µm thick. In this example, the probe was submerged in the liquid for detecting bit signals in the liquid.

As in Example 1, recording/retrieving operation was carried out on media (3-D) and (3). As described in Example 3, the bits were examined for shape after 105 cycles of retrieval. For the medium without a liquid layer, it was found that despite the circular shape of bits, a contrast developed from the edge to the center of bits and the periphery of bits was extinct. In regions outside the bits, the noise which was probably caused by contact with the probe was found. In contrast, in medium (3-D) of this example wherein the liquid layer was formed, bits were circular and remained unchanged from the shape they assumed immediately after recording. No noise was found in regions outside the bits, indicating that the medium was resistant to mechanical damages as by probe collision.

Example 7

Recording/retrieving operation was carried out using a capacitive probe 20 mounted on a flying slider 19 and rotating a recording medium 18, i.e., recording medium (3) of Example 1 as shown in FIG. 7. Only two bits were formed in the recording medium and the probe signals detected when the probe passed across the bits were monitored. When a conventional probe which was not mounted on a flying slider was used, the probe failed at its tip upon one revolution of the medium. The probe mounted on the flying slider according to this example experienced no failure and enabled signal readout over 1,000 times.

Example 8

As in Example 1, (8) a recording medium of Si(100)/ZrO$_2$(001) (50 nm)/BaTiO$_3$(001) (100 nm)/Pt(001) (100 nm)/SBN(001) (300 nm) epitaxial structure was manufactured. The SBN film was formed by using the Si(100)/ZrO$_2$ (001) (50 nm)/BaTiO$_3$(001) (100 nm)/Pt(001) (100 nm) structure as a substrate, heating the substrate at a temperature of 700° C., rotating the substrate at 20 rpm, introducing oxygen gas from a nozzle at a rate of 25 cc/min., and supplying metallic Sr, metallic Ba and metallic Nb from their sources at a proportion of 0.25:0.75:2.

Figure 14:
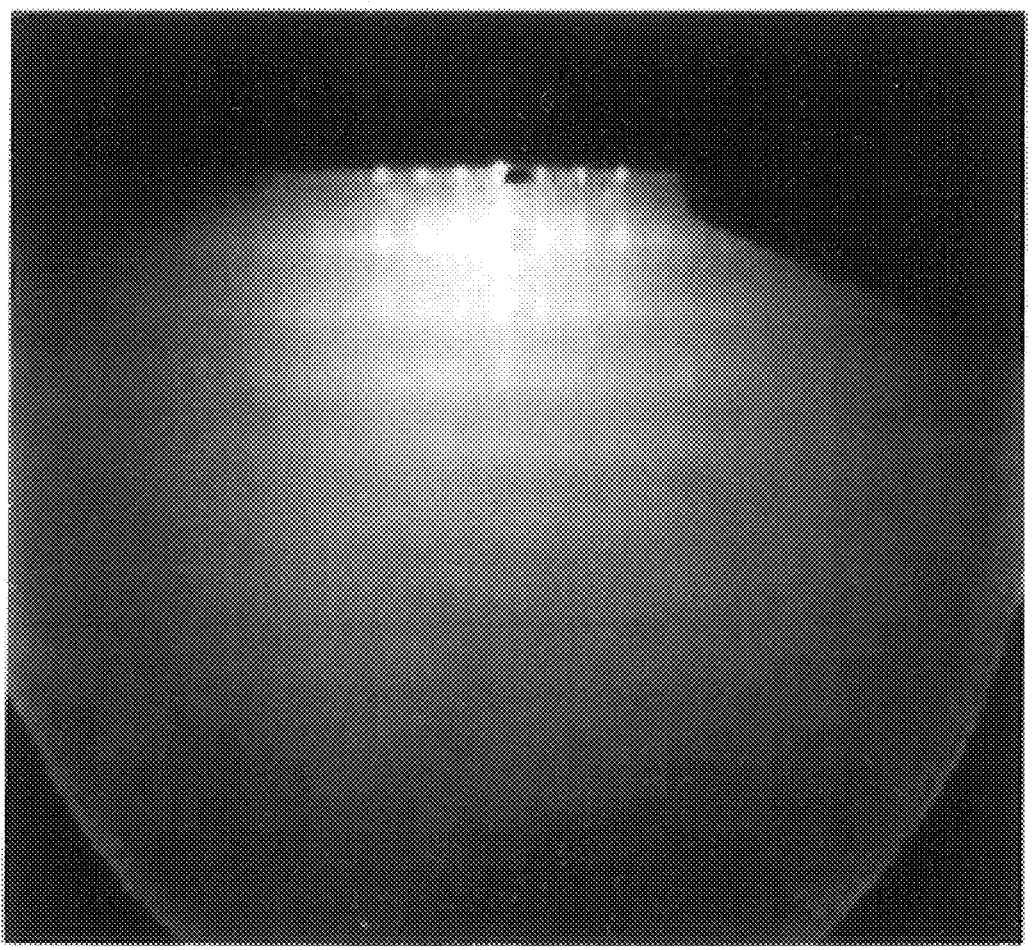
FIG. 14 is a drawing-substituting photograph showing the surface crystalline structure at the surface of a recording medium of Si(100)/ZrO$_2$(001)/BaTiO$_3$(001)/Pt(001)/SBN (001) structure, illustrating a RHEED pattern obtained when an electron beam is incident from [110] direction of the silicon single crystal substrate.
Figure 15:
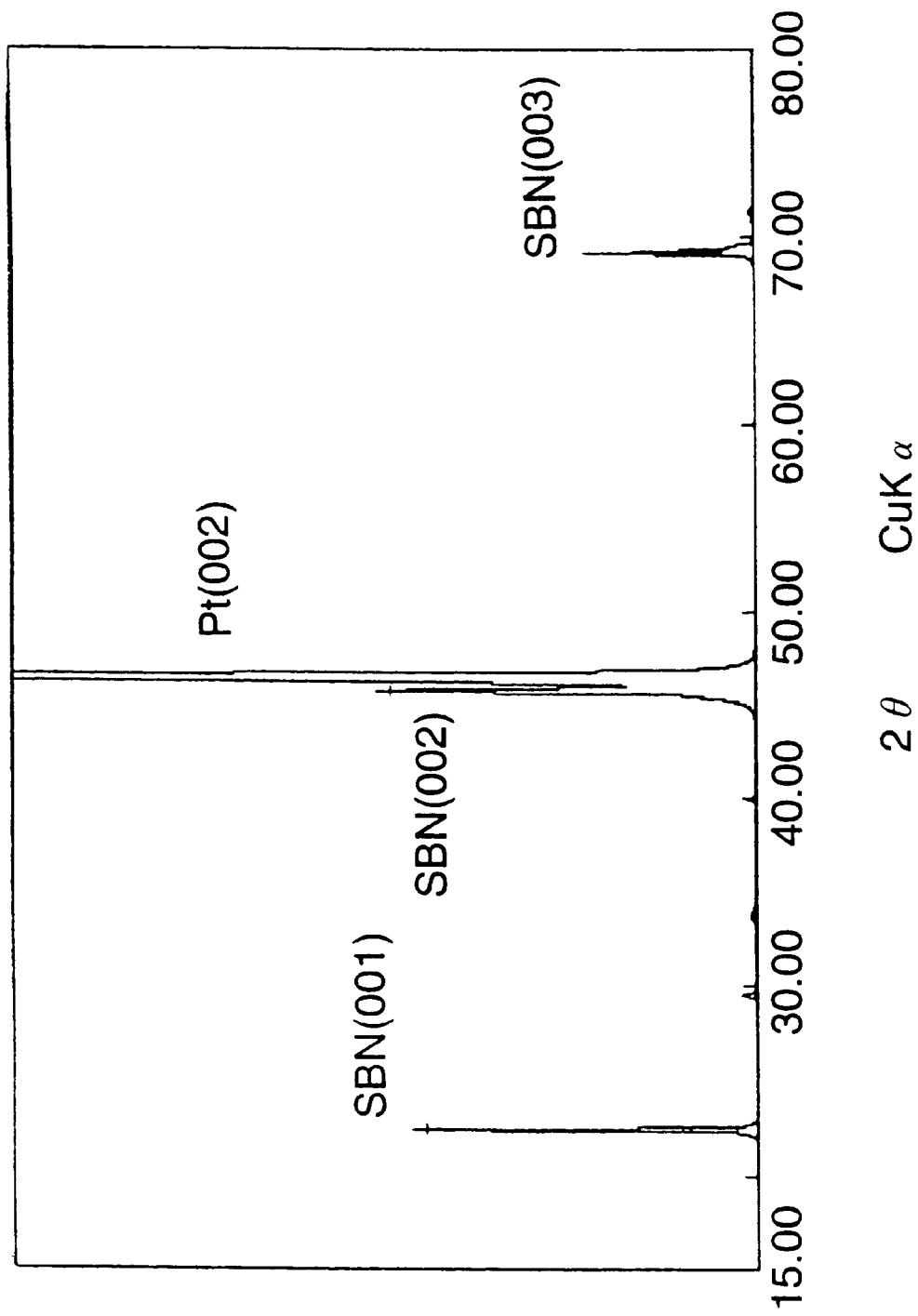
FIG. 15 is a 2θ-θ X-ray diffraction diagram of the Si(100)/ZrO$_2$(001)/BaTiO$_3$(001)/Pt(001)/SBN(001) structure.
Figure 16:
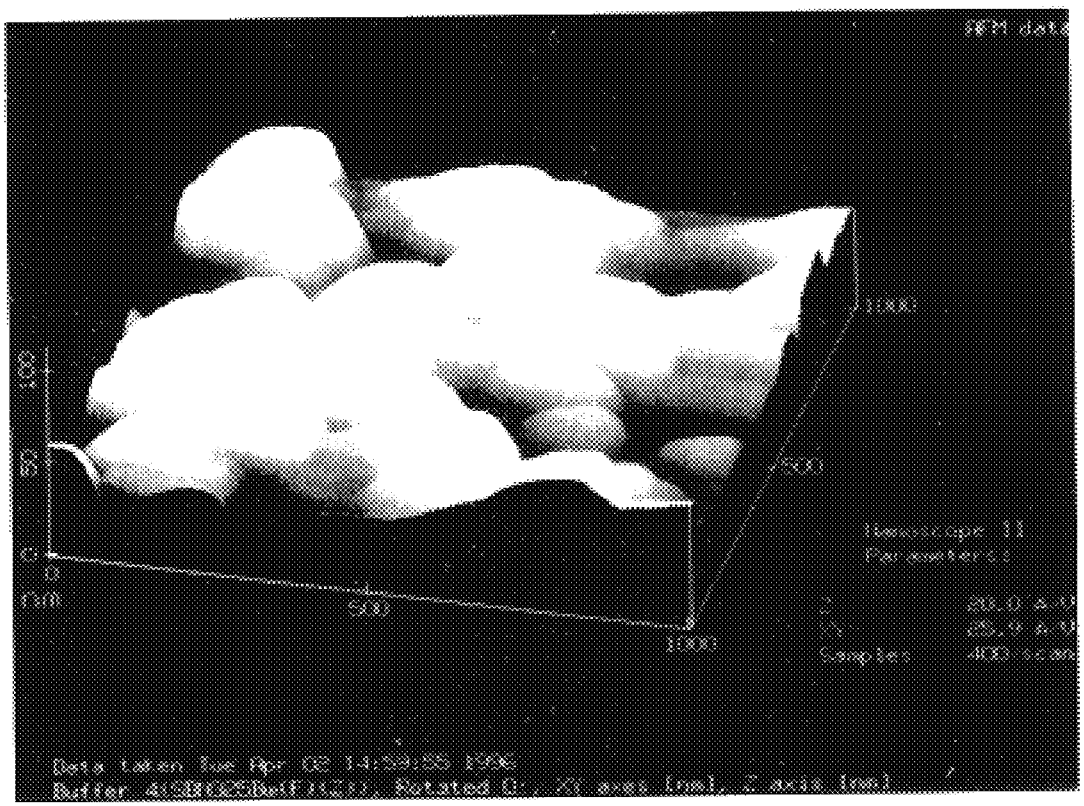
FIG. 16 is a drawing-substituting photograph showing a thin film, illustrating a topographic profile of the SBN film surface of a Si(100)/ZrO$_2$(001)/BaTiO$_3$(001)/Pt(001)/SBN (001) structure as measured by AFM.

The SBN film had a composition represented by a molar ratio Sr:Ba:Nb of 8.4:25.2:66.4 as determined by X-ray fluorescence analysis. A RHEED pattern of the surface of this medium is shown in FIG. 14 and the result of X-ray diffraction is shown in FIG. 15. A topographic profile of the surface of the SBN film as measured by AFM is shown in FIG. 16. The SBN film on the surface was measured for ten point mean roughness Rz as in the previous Example, finding a Rz of 25.2 nm on the average.

Figure 17:
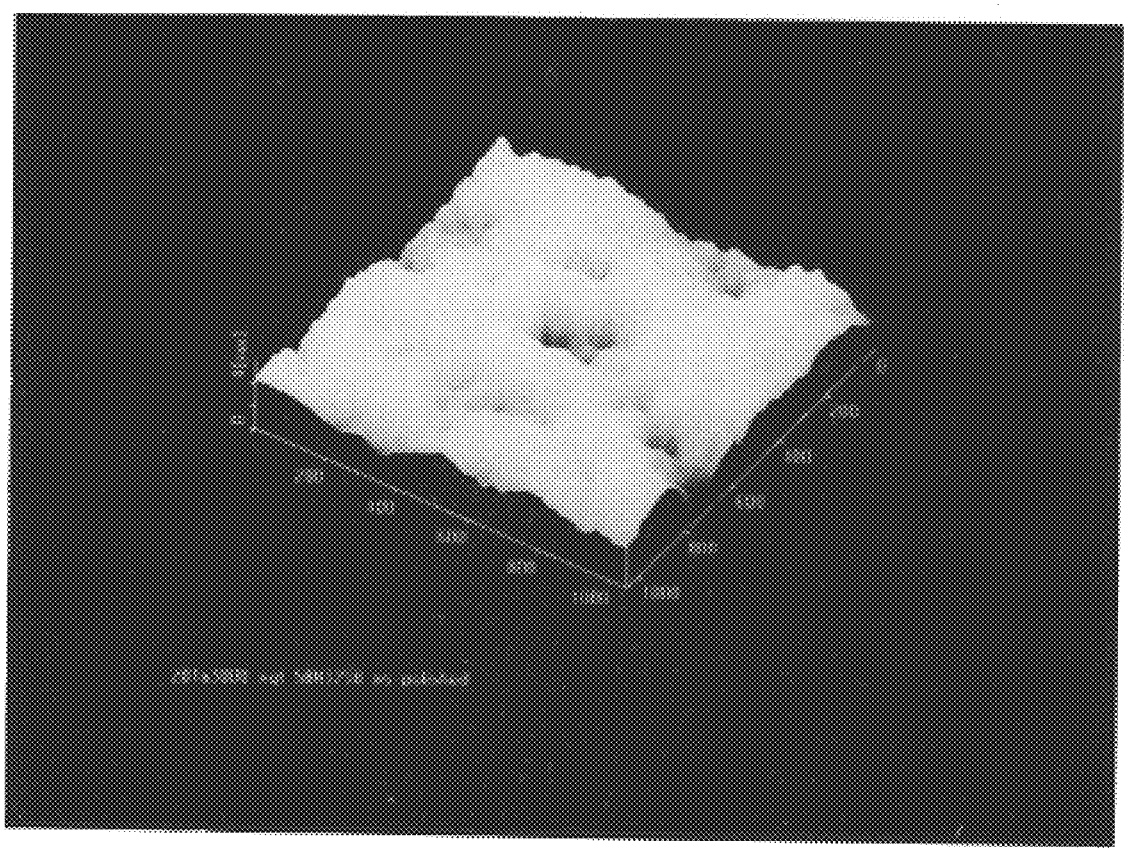
FIG. 17 is a drawing-substituting photograph showing a thin film, illustrating a topographic profile of the SBN film surface as measured by AFM after polishing.

Next, for flattening the surface of the SBN film, it was subject to mechano-chemical polishing. This polishing was carried out according to the conventional technique used for silicon wafer polishing. More particularly, the technique uses a polishing compound having colloidal silica dispersed in a strong alkali solution and an abrasive fabric so that chemical polishing by alkali is combined with mechanical polishing by silica. A topographic profile of the surface of the polished SBN film as measured by AFM is shown in FIG. 17. The polished SBN film on the surface was measured for ten point mean roughness Rz as above, finding a Rz of 1.40 nm on the average, 1.85 nm at the maximum and 0.40 nm at the minimum. It was confirmed that the SBN film was flattened. The thickness of the SBN film was measured to determine a polishing allowance of about 100 nm.

As in Example 1, recording/retrieving operation was carried out on the polished medium. The recorded bits were circular and not deformed under the influence of surface irregularities. The medium enabled stable storage and retrieval.

Example 9

First, as in the previous Example, a Si(100)/ZrO$_2$(001) (10 nm)/BaTiO$_3$(001) (50 nm)/Pt(001) (100 nm) epitaxial structure was prepared as a substrate. It was heated at a temperature of 600° C. and rotated at 20 rpm. A medium was manufactured by introducing radical oxygen gas from an ECR oxygen source at a rate of 10 cc/min. and evaporating PbO, TiOx wherein x=1.67, and Pr from their sources onto the substrate, thereby forming a ferroelectric layer of Pb-Pr-Ti composite oxide (PPT) to a thickness of 300 nm. The thus formed PPT thin film was examined for composition by X-ray fluorescence analysis to find: (Pb+Pr)/Ti=1.00 and Pb/(Pb+Pr)=0.92.

Figure 18:
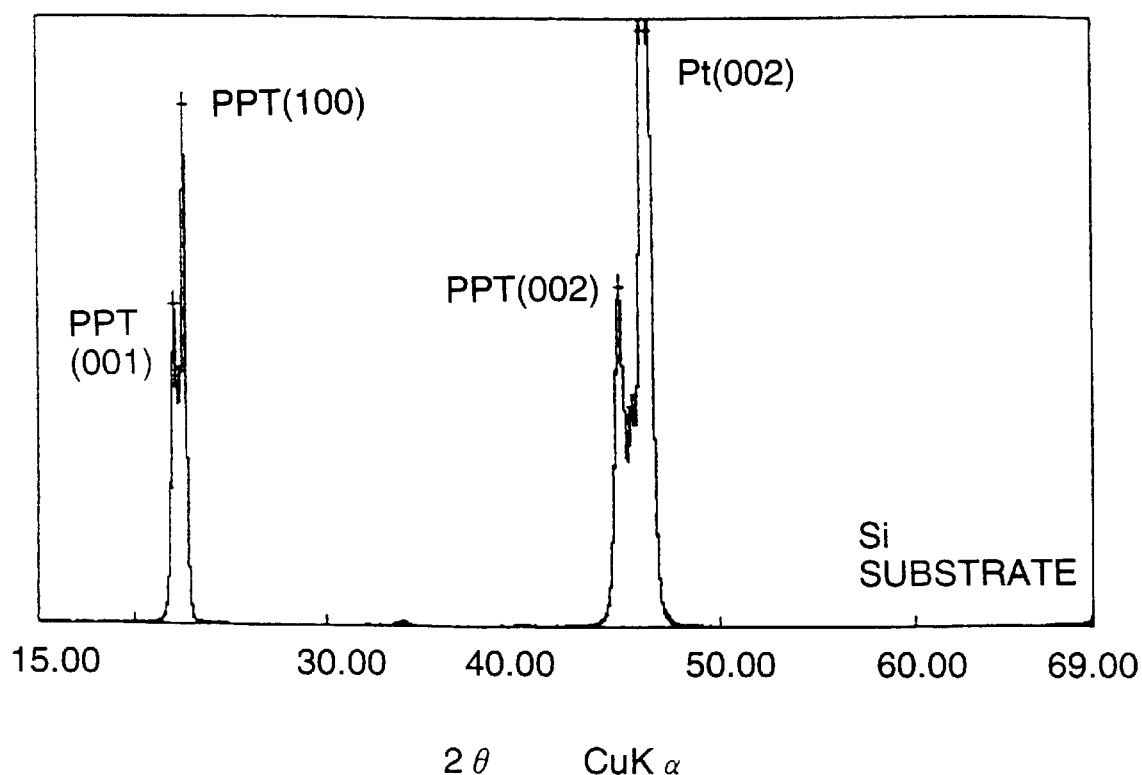
FIG. 18 is a 2θ-θ X-ray diffraction diagram of a Si(100)/ZrO$_2$(001)/BaTiO$_3$(001)/Pt(001)/PPT structure (PPT film's thickness 300 nm) as annealed at 750° C.
Figure 19:
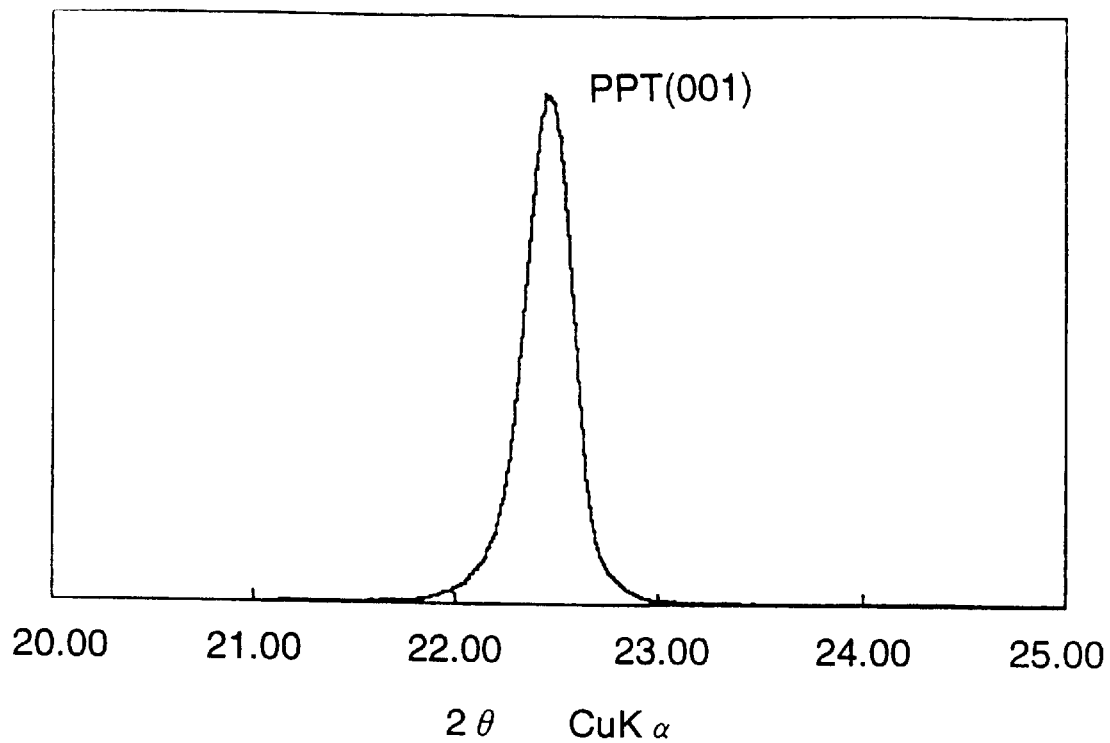
FIG. 19 is a 2θ-θ X-ray diffraction diagram of a Si(100)/ZrO$_2$(001)/BaTiO$_3$(001)/Pt(001)/PPT structure (PPT film's thickness 300 nm) as annealed at 550° C.
Figure 20:
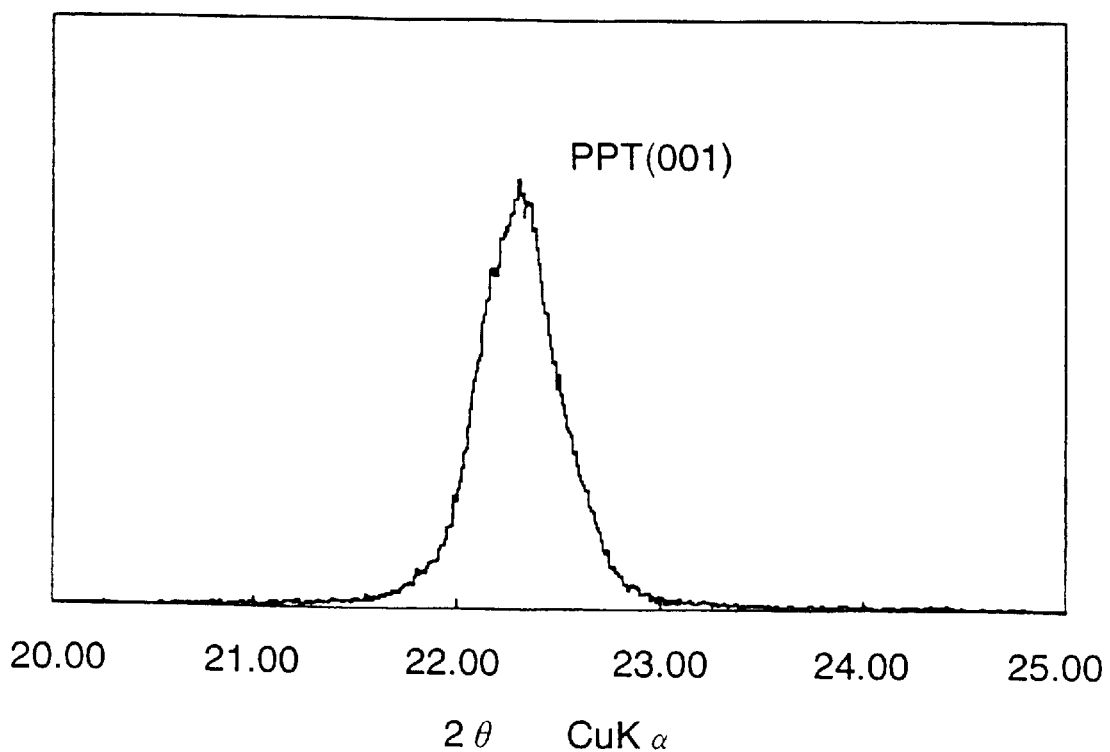
FIG. 20 is a 2θ-θ X-ray diffraction diagram of a Si(100)/ZrO$_2$(001)/BaTiO$_3$(001)/Pt(001)/PPT structure (PPT film's thickness 50 nm) as annealed at 750° C.

This medium was annealed in air at 750° C. for 10 minutes to give a medium (8-1), and the same medium annealed in air at 550° C. for 10 minutes to give a medium (8-2). Additionally, medium (9) was manufactured by the same procedure as medium (8-1) except that the ferroelectric layer had a thickness of 50 nm. The results of X-ray diffraction of media (8-1), (8-2) and (9) are shown in FIGS. 18, 19, and 20, respectively. In medium (8-1), (001) orientation and (100) orientation are co-present. In contrast, in medium (8-2) in which the thickness of the ferroelectric layer was identical, but the annealing temperature was low and medium (9) in which the annealing temperature was identical, but the ferroelectric layer was thin, the (100) peak found in medium (8-1) disappeared, indicating that the ferroelectric layer was of (001) unidirectional orientation. Also, the RHEED patterns showed that the ferroelectric layers of media (8-1) and (9) were epitaxial films. The ferroelectric layers of the media were measured for Rz as above, finding a Rz of less than 2 nm at more than 80% of the measurement points for all the media. However, the minimum of Rz was 1.38 nm in medium (8-1) whose ferroelectric layer was not a unidirectionally oriented film whereas medium (8-2) showed a minimum Rz of 1.2 nm indicating a flat surface and medium (9) having a thin ferroelectric layer showed a minimum Rz of 1.0 nm indicating a flatter surface.

For all the media, the written bits were circular and the minimum size of bits was about 60 nm in diameter. In medium (8-1), no bits were formed at more than 50% of the spots where voltage was applied for bit formation. It is believed that the spots where no bits could be formed belonged to a (100) oriented region.

BENEFITS

There has been described a recording medium having a ferroelectric layer which is a thin film having unidirectionally oriented crystal axes and has a flat surface as measured on the molecular level. Since the recording medium of the invention has a very high degree of flatness required for AFM or STM memories and uniform crystallinity, bits can be formed with minimal noise and high-speed operation is possible. By further forming a protective layer or a lubricating layer on the surface of the ferroelectric layer, a recording medium having sufficiently high reliability to withstand repetitive data rewriting is obtained.

We claim:

1. A ferroelectric recording medium for recording information by utilizing the polarization reversal of a ferroelectric material, comprising a ferroelectric layer having unidirectionally oriented crystal axes on a substrate, said ferroelectric layer having a ten point mean roughness Rz of up to 2 nm across a reference length of 500 nm over at least 80% of its surface, and said ferroelectric layer is of a perovskite material, a tungsten bronze material, or an oxide material containing a rare earth element (inclusive of scandium and yttrium), manganese and oxygen and having a hexagonal YMnO$_3$ crystalline structure.

2. The ferroelectric recording medium of claim 1 wherein said substrate is a silicon single crystal having a Si (111) plane or Si (100) plane at its surface.

3. The ferroelectric recording medium of claim 2 wherein said substrate is constructed of a silicon single crystal having a Si (100) plane at its surface, and said ferroelectric layer is a (001) unidirectionally oriented film constructed of a perovskite material, a (001) unidirectionally oriented film constructed of a tungsten bronze material or a (0001) unidirectionally oriented film constructed of an oxide material containing a rare earth element, (inclusive of scandium and yttrium), manganese and oxygen and having a hexagonal $YMnO_3$ crystalline structure.

4. The ferroelectric recording medium of claim 2 wherein said substrate is constructed of a silicon single crystal having a Si (111) plane at its surface, and said ferroelectric layer is a (0001) unidirectionally oriented film constructed of an oxide material containing a rare earth element, (inclusive of scandium and yttrium), manganese and oxygen and having a hexagonal $YMnO_3$ crystalline structure.

5. The ferroelectric recording medium of claim 3 wherein said ferroelectric layer is an epitaxial film.

6. The ferroelectric recording medium of claim 2 comprising a unidirectionally oriented intermediate oxide layer between said ferroelectric layer and said substrate, wherein said intermediate oxide layer includes a zirconium oxide base layer and/or a rare earth oxide base layer, said zirconium oxide base layer is constructed of zirconium oxide or zirconium oxide stabilized with a rare earth element, (inclusive of scandium and yttrium), and said rare earth oxide base layer is constructed of a rare earth element, (inclusive of scandium and yttrium), oxide.

7. The ferroelectric recording medium of claim 6 wherein said substrate has a Si (100) plane at its surface, and said intermediate oxide layer includes a zirconium oxide base layer which is a tetragonal or monoclinic (001) unidirectionally oriented film or a cubic (100) unidirectionally oriented film, or said intermediate oxide layer includes a rare earth oxide base layer which is a (111) unidirectionally oriented film.

8. The ferroelectric recording medium of claim 6 wherein said substrate has a Si (111) plane at its surface, and said intermediate oxide layer includes a zirconium oxide base layer of (111) unidirectional orientation, or said intermediate oxide layer includes a rare earth oxide base layer of (111) unidirectional orientation.

9. The recording medium of claim 1 further comprising an electrode layer having unidirectionally oriented crystal axes between said substrate and said ferroelectric layer of between an intermediate oxide layer and ferroelectric layer.

10. The ferroelectric recording medium of claim 9 wherein said ferroelectric layer is a (001) unidirectionally oriented film constructed of a perovskite material or a (001) unidirectionally oriented film constructed of a tungsten bronze material, and said electrode layer is a tetragonal (001) unidirectionally oriented film or a cubic (100) unidirectionally oriented film.

11. The ferroelectric recording medium of claim 9 wherein said ferroelectric layer is a (0001) unidirectionally oriented film constructed of an oxide material containing a rare earth element, (inclusive of scandium and yttrium), manganese and oxygen and having a hexagonal $YMnO_3$ crystalline structure, and said electrode layer is a (111) unidirectionally oriented film.

12. The ferroelectric recording medium of claim 9 wherein said electrode layer is constructed of a metal or conductive oxide.

13. The ferroelectric recording medium of claim 12 wherein said metal contains at least one member selected from the group consisting of Pt, Ir, Os, Re, Pd, Rh, and Ru, and said conductive oxide is an indium-containing oxide or perovskite oxide.

14. The ferroelectric recording medium of claim 1 wherein said substrate is conductive.

15. The ferroelectric recording medium of claim 1 wherein said substrate is a semiconductor so that a depletion layer is formed in the substrate as a result of polarization reversal of the ferroelectric layer.

16. A ferroelectric recording medium for recording information by utilizing the polarization reversal of a ferroelectric material, comprising a ferroelectric layer on a substrate according to claim 1 said ferroelectric layer having been treated on its surface to be conductive.

17. A ferroelectric recording medium for recording information by utilizing the polarization reversal of a ferroelectric material, comprising a ferroelectric layer on a substrate according to claim 1 and a protective layer on said ferroelectric layer.

18. The ferroelectric recording medium of claim 17 wherein said protective layer has a resistivity of 10 to $10^7$ $\Omega$cm.

19. The ferroelectric recording medium of claim 17 wherein said protective layer is amorphous.

20. A ferroelectric recording medium for recording information by utilizing the polarization reversal of a ferroelectric material, comprising a ferroelectric layer on a substrate according to claim 1 wherein a lubricating layer constructed of a lubricating material is disposed on the surface of said ferroelectric layer or the surface of said ferroelectric layer has been treated to be lubricative.

21. The ferroelectric recording medium of claim 20 wherein said lubricating material is a solid lubricant.

22. The ferroelectric recording medium of claim 20 wherein said lubricating material is a liquid lubricant.

23. The ferroelectric recording medium of claim 20 wherein said lubricating material is a gas lubricant.

24. The ferroelectric recording medium of claim 1 wherein said ferroelectric layer has a thickness of 5 to 70 nm.

25. The ferroelectric recording medium of claim 1 wherein said ferroelectric layer has been annealed at 300 to 600° C.

26. The ferroelectric recording medium of claim 1 wherein said ferroelectric layer has been mechanically and/or chemically polished on its surface.

27. The ferroelectric recording medium of claim 26 wherein said ferroelectric layer has been polished and then annealed at 300 to 850° C.

28. An information processing apparatus comprising the ferroelectric recording medium of claim 1.

29. The information processing apparatus of claim 28 comprising a probe mounted on a flying slider for writing and reading information from the ferroelectric recording medium.

* * * * *